(12) United States Patent
Shibahara et al.

(10) Patent No.: US 10,536,238 B2
(45) Date of Patent: Jan. 14, 2020

(54) OPTICAL TRANSMISSION SYSTEM, OPTICAL TRANSMISSION APPARATUS, AND OPTICAL RECEPTION APPARATUS

(71) Applicant: NIPPON TELEGRAPH AND TELEPHONE CORPORATION, Tokyo (JP)

(72) Inventors: Kohki Shibahara, Yokosuka (JP); Takayuki Mizuno, Yokosuka (JP); Hiroto Kawakami, Yokosuka (JP); Yutaka Miyamoto, Yokosuka (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 15/775,265

(22) PCT Filed: Jan. 11, 2017

(86) PCT No.: PCT/JP2017/000609
§ 371 (c)(1),
(2) Date: May 10, 2018

(87) PCT Pub. No.: WO2017/122667
PCT Pub. Date: Jul. 20, 2017

(65) Prior Publication Data
US 2018/0375607 A1 Dec. 27, 2018

(30) Foreign Application Priority Data

Jan. 12, 2016 (JP) ................................ 2016-003805

(51) Int. Cl.
*H04B 10/50* (2013.01)
*H04J 14/04* (2006.01)
(Continued)

(52) U.S. Cl.
CPC ............ *H04J 14/04* (2013.01); *H04B 7/0413* (2013.01); *H04B 7/0667* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 2012/0177365 A1 | 7/2012 | Winzer | |
| 2012/0224807 A1* | 9/2012 | Winzer | .................... G02B 6/14 385/28 |

(Continued)

FOREIGN PATENT DOCUMENTS

| | | |
|---|---|---|
| CN | 101834672 A | 9/2010 |
| CN | 103562763 A | 2/2014 |

(Continued)

OTHER PUBLICATIONS

Office Action (Notice of Reasons for Rejection) in related application JP 2017-561130, JPO, dated Sep. 4, 2018, with English translation attached.

(Continued)

*Primary Examiner* — Omar S Ismail
(74) *Attorney, Agent, or Firm* — Harness, Dickey & Pierce, P.L.C.

(57) ABSTRACT

An optical transmission system includes an optical transmission apparatus and an optical reception apparatus. The optical transmission apparatus includes a conversion unit that converts multiple binary data sequences into data in a predetermined signal format; a coding unit that generates multiple pieces of coded data by performing predetermined coding on each of the multiple pieces of converted data; an optical signal generation unit that generates multiple optical signals by converting the multiple pieces of coded data into (Continued)

optical signals; and a mode multiplexer that converts the multiple optical signals into different modes, generates a mode-division multiplexed optical signal by mode-division multiplexing the optical signals, and transmits the generated mode-division multiplexed optical signal to the optical reception apparatus. The optical reception apparatus includes a mode demultiplexer that demultiplexes the mode-division multiplexed optical signal transmitted from the optical transmission apparatus into light in different modes; a photoelectric conversion unit that converts the light in the multiple different modes into electrical signals; an analog/digital conversion unit that converts the multiple electrical signals into coded data; and an MIMO equalization processing unit that performs MIMO equalization processing on the converted coded data.

9 Claims, 14 Drawing Sheets

(51) Int. Cl.
| | |
|---|---|
| *H04B 7/0413* | (2017.01) |
| *H04B 10/69* | (2013.01) |
| *H04L 25/03* | (2006.01) |
| *H04B 7/06* | (2006.01) |
| *H04L 1/06* | (2006.01) |
| *H04B 10/2581* | (2013.01) |

(52) U.S. Cl.
CPC ......... *H04B 10/2581* (2013.01); *H04B 10/50* (2013.01); *H04B 10/69* (2013.01); *H04L 1/0618* (2013.01); *H04L 1/0625* (2013.01); *H04L 1/0631* (2013.01); *H04L 25/03006* (2013.01)

(56) References Cited

U.S. PATENT DOCUMENTS

| | | | | |
|---|---|---|---|---|
| 2013/0100914 A1* | 4/2013 | Nakamura | ............ | H04B 7/0413 |
| | | | | 370/329 |
| 2013/0230079 A1* | 9/2013 | Solomon | .............. | H04B 7/0413 |
| | | | | 375/219 |
| 2013/0236195 A1* | 9/2013 | Ryf | ...................... | H04B 10/615 |
| | | | | 398/208 |
| 2013/0336654 A1* | 12/2013 | Arikawa | .............. | H04B 10/614 |
| | | | | 398/65 |
| 2014/0126588 A1* | 5/2014 | Koebele | ............. | H04B 10/2581 |
| | | | | 370/542 |
| 2014/0140694 A1* | 5/2014 | Zhou | ...................... | H04J 14/02 |
| | | | | 398/44 |
| 2014/0169501 A1* | 6/2014 | Nazarathy | .......... | H03H 17/0266 |
| | | | | 375/316 |
| 2014/0199066 A1* | 7/2014 | Martelli | ............. | H04B 10/2581 |
| | | | | 398/44 |
| 2014/0205283 A1* | 7/2014 | Djordjevic | ......... | H04B 10/2581 |
| | | | | 398/44 |
| 2015/0023674 A1* | 1/2015 | Salsi | ..................... | H04B 10/61 |
| | | | | 398/202 |
| 2015/0104168 A1* | 4/2015 | Djordjevic | .............. | H04J 14/04 |
| | | | | 398/44 |
| 2016/0352362 A1* | 12/2016 | Fonseka | ............ | H03M 13/2906 |

FOREIGN PATENT DOCUMENTS

| | | |
|---|---|---|
| CN | 103609040 A | 2/2014 |
| CN | 203942526 U | 11/2014 |
| JP | 2014-506433 A | 3/2014 |
| WO | WO-2015/052895 A1 | 4/2015 |

OTHER PUBLICATIONS

First Chinese Office Action regarding CNSN 2017800040104, dated Mar. 27, 2019.
Ho, Keang-Po and Joseph M. Kahn, "Frequency diversity in mode-division multiplexing systems", Journal of Lightwave Technology, vol. 29, No. 24, 2011, pp. 3719-3726.
Alamouti, Siavash M., "A simple transmit diversity technique for wireless communications", IEEE Journal on Select Areas in Communications, vol. 16, No. 8, Oct. 1998, pp. 1451-1458.
Tarokh, Vahid et al., "Space-time codes for high data rate wireless communication: Performance criterion and code construction", IEEE Transactions on Information Theory, vol. 44, No. 2, Mar. 1998, pp. 744-765.
Jean-Claude Belflore et al., "The Golden code: A 2 × 2 full-rate space-time code with non-vanishing determinants", IEEE Transactions on information theory, vol. 51, No. 4, 2005, pp. 1432-1436.
Li, An, et al., "Reception of mode and polarization multiplexed 107-Gb/s CO-OFDM signal over a two-mode fiber", National Fiber Optic Engineers Conference, Optical Society of America, 2011.
Mori Takayoshi et al., "Equipartition multiplexing technique for equalizing channel dependent degradation in MDM transmission", Optical Fiber Communication Conference, Optical Society of America, 2015.
International Search Report for PCT/JP2017/000609, ISA/JP, Tokyo, dated Mar. 7, 2017, with English translation attached.

* cited by examiner

OPTICAL TRANSMISSION SYSTEM, OPTICAL TRANSMISSION APPARATUS, AND OPTICAL RECEPTION APPARATUS

CROSS-REFERENCE TO RELATED APPLICATIONS

This application is a 371 U.S. National Stage of International Application No. PCT/JP2017/000609, filed Jan. 11, 2017, which claims the benefit of and priority to Japanese Patent Application No. 2016-003805, filed Jan. 12, 2016. The disclosures of the above applications are incorporated herein by reference.

TECHNICAL FIELD

The present invention relates to optical transmission technology.

BACKGROUND ART

With the rapid development of broadband services that has accompanied the spread of fiber-optic communications in recent years, communication capacity has been increasing yearly. The increased capacity of optical networks handling the rapid increase in communication capacity has, until now, been achieved by increasing the capacity of optical communication system apparatus without changing the structure of the optical fiber. The optical fibers that form the basis for current high-capacity optical networks are single-mode fibers. Single-mode fibers are optical fibers in which there is a single core that serves as the passage for optical signals in each optical fiber, and which are excited in only a single mode. These are able to form optical networks that have the capacity to transmit several terabits per second over long distances.

However, due to the rate of increase in communication capacity in recent years, a pressing issue has been the manner in which the communication capacity can be further increased. By using, as the transmission medium, an optical fiber, known as a multi-mode fiber, which has a core through which signal light propagates in multiple modes, the communication capacity per fiber can be increased by the number of modes that are used. However, multi-mode fibers have higher transmission loss and the like compared with single-mode fibers, and signals that have undergone intermodal coupling during propagation must be separated after being received. For this reason, multi-mode fibers have been considered to be unsuitable for long-distance transmission, and have been used only in limited fashion, mainly as transmission media for short-distance communications such as in LANs (Local Area Networks). However, due to the development of MIMO (Multiple-Input Multiple-Output) signal processing technology used in wireless communication systems and optical amplifiers for multi-mode fibers in recent years, there has been active research and development into mode-division multiplexing optical communication schemes using multi-mode fibers, and the possibility of a solution to the above-mentioned problem of increasing the communication capacity has been suggested.

In order to put into practice the above-mentioned mode-division multiplexing optical communication scheme using multi-mode fibers, which has been actively considered in recent years, it is essential to have a technology that makes it possible to stably transmit optical signals over long distances without lowering the quality thereof. Performance evaluation indicators for multi-mode fiber transmission include intermodal dispersion and mode-dependent loss, and it is important to control and compensate the optical signals on the basis of these indicators so that the quality is not lowered. Of the above-mentioned indicators, mode-dependent loss is a phenomenon whereby the optical intensity loss differs for each propagation mode, which occurs, for example, in multi-mode optical amplifiers and mode multiplexer/demultiplexers. The phenomenon that occurs in multi-mode optical amplifiers is, to be precise, mode-dependent gain, but in the following description, mode-dependent loss will be used as an expression that includes mode-dependent gain.

However, in conventional multi-mode fiber transmission, there is significant degradation of optical signals due to mode-dependent loss, thus precluding longer-distance multi-mode fiber transmission. One might contemplate using, for example, a multi-span optical transmission system in which multi-mode fibers and multi-mode optical amplifiers are arranged in multiple stages. While multi-mode optical amplifiers are used for the purpose of compensating for transmission loss that has occurred on a multi-mode fiber, mode-dependent loss generally occurs in multi-mode optical amplifiers, so it is not possible to precisely compensate for the transmission loss of all of the mode signals. The mode-dependent loss that occurs on each span accumulates as a signal passes through the spans, and ultimately, it becomes impossible to transmit specific mode signals. As another example, one might contemplate transmitting a single data sequence by multi-mode fiber transmission. Due to the mode-dependent loss that occurs during transmission, the signal quality of specific modes will be degraded, and under the influence thereof, the optical signal quality of all of the modes will, on average, be largely degraded, as a result of which the transmission of the single data sequence may be greatly affected. If the mode-dependent loss that occurs on the transmission path is known at the transmitting end, a transmission method with good transmission efficiency that takes the mode-dependent loss into consideration could be provided, for example, by using the water-filling principle or the like. However, it is known that mode-dependent loss generally varies probabilistically in association with mode coupling (see, e.g., Non-Patent Document 1), and it is difficult to continuously pre-acquire mode-dependent loss information at the transmitting end by means of feedback control from the receiving end.

PRIOR ART DOCUMENT

Non-Patent Document

Non-Patent Document 1: Ho, Keang-Po and Joseph M. Kahn, "Frequency diversity in mode-division multiplexing systems", Journal of Lightwave Technology, Vol. 29, No. 24, 2011, pp. 3719-3726.

SUMMARY OF INVENTION

Problems to be Solved by the Invention

As described above, in conventional multi-mode fiber transmission, it is difficult to pre-acquire information on the mode-dependent loss and incorporate countermeasures at the transmitting end, and there is a problem in that the degradation of optical signals caused by mode-dependent loss can preclude application to longer distances.

In view of the above-described circumstances, the present invention has the purpose of providing a technology that can improve the robustness of spatially multiplexed signals against mode-dependent loss in a spatial multiplexing transmission system.

Means for Solving the Problems

One aspect of the present invention is an optical transmission system including an optical transmission apparatus and an optical reception apparatus, wherein the optical transmission apparatus includes: a conversion unit that converts multiple binary data sequences into data in a predetermined signal format; a coding unit that generates multiple pieces of coded data by performing predetermined coding on each of the multiple pieces of converted data; an optical signal generation unit that generates multiple optical signals by converting the multiple pieces of coded data to optical signals; and a mode multiplexer that converts the multiple optical signals to different modes, generates a mode-division multiplexed optical signal by mode-division multiplexing the optical signals, and transmits the generated mode-division multiplexed optical signal to the optical reception apparatus, and the optical reception apparatus includes: a mode demultiplexer that demultiplexes the mode-division multiplexed optical signal transmitted from the optical transmission apparatus into light in different modes; a photoelectric conversion unit that converts the light in the multiple different modes into electrical signals; an analog/digital conversion unit that converts the multiple electrical signals into coded data; and an MIMO equalization processing unit that performs MIMO equalization processing on the converted coded data.

One aspect of the present invention is an optical transmission system including an optical transmission apparatus and an optical reception apparatus, wherein the optical transmission apparatus includes: a conversion unit that converts multiple binary data sequences to data in a predetermined signal format; a coding unit that generates coded data by performing predetermined coding on a portion of the data among the multiple pieces of converted data; an optical signal generation unit that generates multiple optical signals by converting the coded data and uncoded data into optical signals; and a mode multiplexer that converts the multiple optical signals into different modes, generates a mode-division multiplexed optical signal by mode-division multiplexing the optical signals, and transmits the generated mode-division multiplexed optical signal to the optical reception apparatus, and the optical reception apparatus includes: a mode demultiplexer that demultiplexes the mode-division multiplexed optical signal transmitted from the optical transmission apparatus into light in different modes; a photoelectric conversion unit that converts the light in the multiple different modes into electrical signals; an analog/digital conversion unit that converts the multiple electrical signals into one of the coded data and the uncoded data; and an MIMO equalization processing unit that performs MIMO equalization processing on the converted coded data and the converted uncoded data.

According to one aspect of the present invention, in the above-mentioned optical transmission system, the coding unit performs the predetermined coding by orthogonal transform.

One aspect of the present invention is an optical transmission system including an optical transmission apparatus and an optical reception apparatus, wherein the optical transmission apparatus includes: a conversion unit that converts multiple binary data sequences into data in a predetermined signal format; an optical signal generation unit that generates multiple optical signals by converting the multiple pieces of data into optical signals; a mode multiplexer that converts the multiple generated optical signals into different modes and generates a mode-division multiplexed optical signal by mode-division multiplexing the optical signals; and a mode mixing unit that performs mode mixing on the generated mode-division multiplexed optical signal, effectively applies a predetermined coding effect to the mode-division multiplexed optical signal, and transmits the mode-mixed mode-division multiplexed optical signal to the optical reception apparatus, and the optical reception apparatus includes: a mode demultiplexer that demultiplexes the mode-mixed mode-division multiplexed optical signal transmitted from the optical transmission apparatus into light in different modes; a photoelectric conversion unit that converts the light in the multiple different modes into electrical signals; an analog/digital conversion unit that converts the multiple electrical signals into the data; and an MIMO equalization processing unit that performs MIMO equalization processing on the converted data.

According to one aspect of the present invention, in the above-mentioned optical transmission system, the mode mixing unit effectively applies the predetermined coding effect to the mode-division multiplexed optical signal by orthogonal transform.

One aspect of the present invention is an optical transmission apparatus in an optical transmission system including the optical transmission apparatus and an optical reception apparatus, the optical transmission apparatus including: a conversion unit that converts multiple binary data sequences into data in a predetermined signal format; a coding unit that generates multiple pieces of coded data by performing predetermined coding on each of the multiple pieces of converted data; an optical signal generation unit that generates multiple optical signals by converting the multiple pieces of coded data into optical signals; and a mode multiplexer that converts the multiple optical signals into different modes, generates a mode-division multiplexed optical signal by mode-division multiplexing the optical signals, and transmits the generated mode-division multiplexed optical signal to the optical reception apparatus.

One aspect of the present invention is an optical transmission apparatus in an optical transmission system including the optical transmission apparatus and an optical reception apparatus, the optical transmission apparatus including: a conversion unit that converts multiple binary data sequences into data in a predetermined signal format; a coding unit that generates coded data by performing predetermined coding on a portion of the data among the multiple pieces of converted data; an optical signal generation unit that generates multiple optical signals by converting the coded data and uncoded data into optical signals; and a mode multiplexer that converts the multiple optical signals into different modes, generates a mode-division multiplexed optical signal by mode-division multiplexing the optical signals, and transmits the generated mode-division multiplexed optical signal to the optical reception apparatus.

One aspect of the present invention is an optical transmission apparatus in an optical transmission system including the optical transmission apparatus and an optical reception apparatus, the optical transmission apparatus including: a conversion unit that converts multiple binary data sequences into data in a predetermined signal format; an optical signal generation unit that generates multiple optical signals by converting the multiple pieces of data into optical signals; a mode multiplexer that converts the multiple generated optical signals into different modes and generates a mode-division multiplexed optical signal by mode-division multiplexing the optical signals; and a mode mixing unit that performs mode mixing on the generated mode-division multiplexed optical signal, effectively applies a predetermined coding effect to the mode-division multiplexed optical signal, and transmits the mode-mixed mode-division multiplexed optical signal to the optical reception apparatus.

Advantageous Effects of the Invention

According to the present invention, it is possible to improve the robustness of spatially multiplexed signals against mode-dependent loss in a spatial multiplexing transmission system.

MODES FOR CARRYING OUT THE INVENTION

Hereinbelow, embodiments of the present invention will be described with reference to the drawings.

First Embodiment

Figure 1:
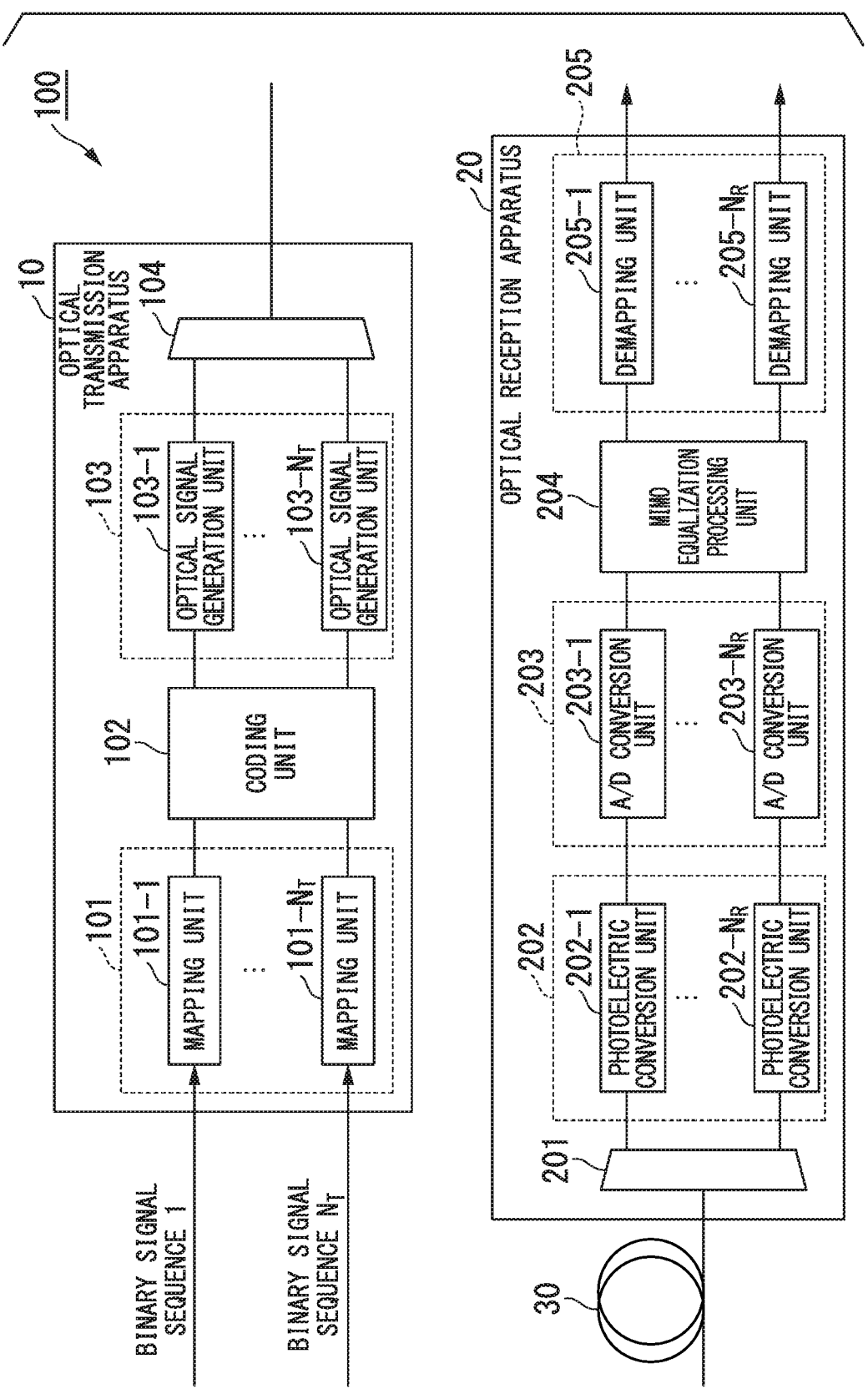
FIG. 1 is a diagram showing the system configuration of an optical transmission system 100 according to a first embodiment.

FIG. 1 is a diagram showing the system configuration of an optical transmission system 100 according to the first embodiment. The optical transmission system 100 includes an optical transmission apparatus 10 and an optical reception apparatus 20. The optical transmission apparatus 10 and the optical reception apparatus 20 are connected so as to be capable of communicating via an optical transmission path 30. It is to be noted that the total number of binary signal sequences that are transmitted is defined as $N_T$ and the number of modes supported by the optical transmission path 30 is defined as M. Generally, the relationship $M \geq N_T$ will be established. However, in the present specification, for the sake of simplicity, an example wherein $N_T=M$, in other words, wherein all of the modes are used for mode-division multiplexed transmission, will be considered. It is to be noted that the optical transmission path 30 transmits optical signals between the optical transmission apparatus 10 and the optical reception apparatus 20. The optical transmission path 30 is, for example, a multi-mode optical fiber. Hereinbelow, the configuration of the optical transmission apparatus 10 and the optical reception apparatus 20 will be specifically described.

First, the optical transmission apparatus 10 will be described. The optical transmission apparatus 10 includes a mapping unit 101, a coding unit 102, an optical signal generation unit 103, and a mode multiplexer 104.

The mapping unit 101 is formed from multiple mapping units 101-1 to 101-$N_T$ (where $N_T$ is an integer greater than or equal to 2). Multiple binary signal sequences 1 to $N_T$ are inputted to the mapping unit 101. The mapping unit 101 converts the signal format of each of the inputted binary signal sequences 1 to $N_T$ into a desired signal format. For example, a binary signal sequence 1 is inputted to the mapping unit 101-1, and the signal format of the inputted binary signal sequence 1 is converted into a desired signal format. Additionally, for example, a binary signal sequence $N_T$ is inputted to the mapping unit 101-$N_T$, and the signal format of the inputted binary signal sequence $N_T$ is converted into a desired signal format. The signal format referred to here may, for example, be quadrature phase-shift keying or 16-quadrature amplitude modulation. Hereinbelow, a signal sequence of which the signal format has been converted into a desired signal format by the mapping unit 101 will be referred to as a symbol sequence. The mapping unit 101 outputs multiple symbol sequences 1 to $N_T$ to the coding unit 102.

The coding unit 102 generates coded symbol sequences 1 to $N_T$ by space-time coding each of the $N_T$ symbol sequences outputted from the mapping unit 101. In the present embodiment, an example in which orthogonal transform is used for space-time coding will be described. Orthogonal transform as mentioned here refers to transform wherein the product of a matrix used for the transform and the complex conjugate transpose matrix thereof is an identity matrix, examples of which include transforms using a rotation matrix, transforms using an Hadamard matrix and transforms using a discrete Fourier matrix. It is to be noted that hereinbelow, among these transforms, an example of transform using an Hadamard matrix in particular will be described. The coding unit 102 outputs the multiple coded symbol sequences 1 to $N_T$ that have been generated to the optical signal generation unit 103.

The optical signal generation unit 103 is formed from multiple optical signal generation units 103-1 to 103-$N_T$. The coded symbol sequences 1 to $N_T$ outputted from the coding unit 102 are inputted to the optical signal generation unit 103. The optical signal generation unit 103 converts the inputted coded symbol sequences 1 to $N_T$ into optical signals. For example, a coded symbol sequence 1 is inputted to the optical signal generation unit 103-1, and the inputted coded symbol sequence 1 is converted into an optical signal. Additionally, for example, a coded symbol sequence $N_T$ is inputted to the optical signal generation unit 103-$N_T$, and the inputted coded symbol sequence $N_T$ is converted into an optical signal. The optical signal generation unit 103 outputs multiple optical signals to the mode multiplexer 104.

The multiple optical signals that are outputted from the optical signal generation unit 103 are inputted to the mode multiplexer 104. The mode multiplexer 104 generates a mode-division multiplexed optical signal by mode-multiplexing the multiple inputted optical signals. The mode multiplexer 104 transmits the generated mode-division multiplexed optical signal to the optical reception apparatus 20 via the optical transmission path 30.

Here, the coding unit 102 will be further described. In a multi-mode optical fiber, the number of modes that are supported differs depending on the normalized frequency, but in the present embodiment, an example of a multi-mode optical fiber having four supported modes, LP01, LP11, LP21, and LP02, will be considered. Each LP mode has multiple degenerate modes, such that the LP01 mode has two degeneracies, LP11 has four degeneracies, LP21 has four degeneracies, and LP02 has two degeneracies. It is to be noted that degeneracy occurs when there are multiple mode numbers having the same effective refractive index. Therefore, the total number M of modes that can be used for mode-division multiplexed transmission in this case, when including the respective degenerate modes, is twelve (LP01X, LP01Y, LP11aX, LP11aY, LP11bX, LP11bY, LP21aX, LP21aY, LP21bX, LP21bY, LP02X, LP02Y). In other words, in the first embodiment, the coding unit 102 time-space codes all twelve modes mentioned above.

Next, the optical reception apparatus 20 will be described. The optical reception apparatus 20 includes a mode demultiplexer 201, a photoelectric conversion unit 202, an A/D (analog/digital) conversion unit 203, an MIMO equalization processing unit 204, and a demapping unit 205.

The mode-division multiplexed optical signal transmitted from the optical transmission apparatus 10 is inputted to the mode demultiplexer 201. The mode demultiplexer 201 separates (demultiplexes) the inputted mode-division multiplexed optical signal into multiple fundamental mode signals (optical signals). The mode demultiplexer 201 outputs each of the separated optical signals to the photoelectric conversion unit 202.

The photoelectric conversion unit 202 is formed from multiple photoelectric conversion units 202-1 to 202-Ng (where $N_R$ is an integer greater than or equal to 2). It is to be noted that generally, $N_R$ is different from $N_T$. In the present embodiment, there is no limit on the numbers of $N_R$ and $N_T$. The multiple optical signals outputted from the mode demultiplexer 201 are inputted to the photoelectric conversion unit 202. The photoelectric conversion unit 202 converts the multiple inputted optical signals, respectively, into electrical signals (coded symbol sequences). The photoelectric conversion unit 202 outputs the electrical signals to the A/D conversion unit 203.

The A/D conversion unit 203 is formed from multiple A/D conversion units 203-1 to 203-$N_R$. The multiple electrical signals outputted from the photoelectric conversion unit 202 are inputted to the A/D conversion unit 203. The A/D conversion unit 203 converts the multiple inputted electrical signals, respectively, into digital signals. The A/D conversion unit 203 outputs the multiple digital signals to the MIMO equalization processing unit 204.

The multiple digital signals outputted from the A/D conversion unit 203 are inputted to the MIMO equalization processing unit 204. The MIMO equalization processing unit 204 performs processes corresponding to equalization and space-time decoding on the multiple inputted digital signals. In general, maximum likelihood decoding is used for space-time decoding, but in the above-mentioned example using Hadamard transform, decoding may be performed by using a MIMO-structured transversal equalization filter included in the MIMO equalization processing unit 204. In the case of such a configuration, there is no need for the optical reception apparatus 20 to have a space-time decoder, and decoding is possible with a multi-mode demodulator based on conventional MIMO equalization processing. The MIMO equalization processing unit 204 restores the multiple symbol sequences by decoding the multiple digital signals. The MIMO equalization processing unit 204 outputs each of the multiple restored symbol sequences to the demapping unit 205.

The demapping unit 205 is formed from multiple demapping units 205-1 to 205-$N_R$. The multiple symbol sequences outputted from the MIMO equalization processing unit 204 are inputted to the demapping unit 205. The demapping unit 205 generates multiple binary signal sequences by demapping the multiple inputted symbol sequences. The demapping unit 205 outputs the multiple generated binary signal sequences.

Figure 2:
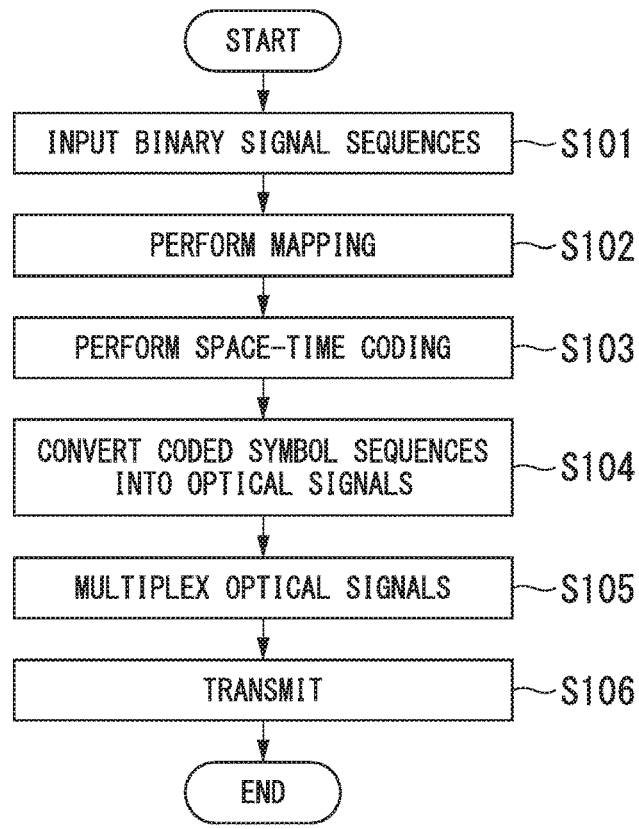
FIG. 2 is a flow chart showing the processing flow in an optical transmission apparatus 10 in the first embodiment.

FIG. 2 is a flow chart showing the processing flow in the optical transmission apparatus 10 in the first embodiment.

A binary signal sequence is inputted to each of the mapping units 101-1 to 101-$N_T$ (step S101). The mapping unit 101 generates a symbol sequence by mapping (arranging) the inputted binary signal sequences onto a complex plane (step S102). The mapping unit 101 outputs the multiple generated symbol sequences to the coding unit 102. The coding unit 102 generates multiple coded symbol sequences by space-time coding, respectively, the multiple symbol sequences outputted from the mapping unit 101 (step S103). Specifically, the coding unit 102 performs the following processes. Here, the symbols before space-time coding and after space-time coding are defined respectively as $s_i(t)$ and $x_i(t)$. Here, the subscript "i" (where i=1 to M and M=$N_1$) represents the mode index number. Using this notation, the symbol sequence vectors before space-time coding and after space-time coding can be expressed respectively by the following Equations 1 and 2. It is to be noted that the "T" refers to transposition.

[Equation 1]

$$s(t)=[s_1(t),s_2(t),\ldots,s_{N_T}(t)]^T \quad \text{(Equation 1)}$$

[Equation 2]

$$x(t)=[x_1(t),x_2(t),\ldots,x_{N_T}(t)]^T \quad \text{(Equation 2)}$$

The coding unit 102 first performs a linear transform as in the following Equation 3, using a Hadamard matrix $H_{NT}$ (where T is a subscript of N) of order $N_T$.

[Equation 3]

$$x(t) = \frac{1}{\sqrt{N_T}} H_{N_T} s(t) \quad \text{(Equation 3)}$$

Next, denoting the symbol sequence vector outputted from the coding unit 102 as the vector y(t), y(t) can be obtained by respectively time-shifting $x_i(t)$ and vectorizing the results. In other words, y(t) is represented by the following Equation 4.

[Equation 4]

$$y(t)=[x_1(t),x_2(t_1-t_2), \ldots ,x_N(t-t_{N_T})]^T \quad \text{(Equation 4)}$$

Due to the above-mentioned time shift, the optical signals that were space-time coded during multi-mode fiber transmission are decorrelated. Through Equations 3 and 4, the transmitted symbols are spread in space and time, making it possible to obtain diversity effects. The coding unit 102 outputs each of the multiple coded symbol sequences that have been generated as described above to the optical signal generation unit 103. A coded symbol sequence outputted from the coding unit 102 is inputted to each of the optical signal generation units 103-1 to 103-$N_T$. The optical signal generation unit 103 converts the multiple inputted coded symbol sequences, respectively, into optical signals (step S104). The optical signal generation unit 103 outputs the multiple optical signals to the mode multiplexer 104. The mode multiplexer 104 generates a mode-division multiplexed optical signal by mode-division multiplexing the multiple optical signals outputted from the optical signal generation unit (step S105). The mode multiplexer 104 transmits the generated mode-division multiplexed optical signal to the optical reception apparatus 20 via the optical transmission path 30 (step S106).

Figure 3:
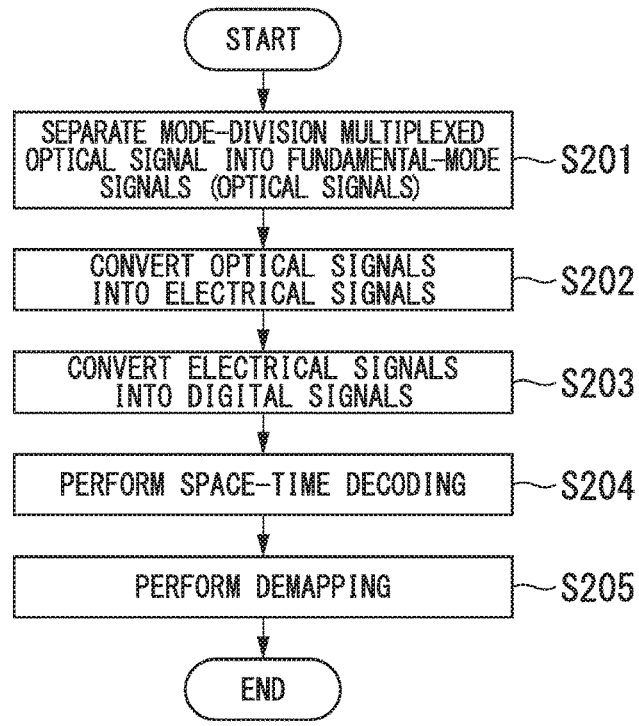
FIG. 3 is a flow chart showing the processing flow in an optical reception apparatus 20 in the first embodiment.

FIG. 3 is a flow chart showing the processing flow in the optical reception apparatus 20 in the first embodiment.

The mode-division multiplexed optical signal transmitted from the optical transmission apparatus 10 is inputted to the mode demultiplexer 201. The mode demultiplexer 201 separates the inputted mode-division multiplexed optical signal into fundamental-mode signals (optical signals) (step S201). The mode demultiplexer 201 outputs each of the separated optical signals to a photoelectric conversion unit 202. The optical signals outputted from the mode demultiplexer 201 are inputted to the photoelectric conversion units 202-1 to 202-$N_R$. The photoelectric conversion unit 202 converts the multiple inputted optical signals, respectively, into electrical signals (step S202). The photoelectric conversion unit 202 outputs each of the multiple electrical signals to the A/D conversion unit 203. The A/D conversion unit 203 converts the multiple electrical signals outputted from the photoelectric conversion unit 202 into digital signals (step S203). The A/D conversion unit 203 outputs the multiple digital signals to the MIMO equalization processing unit 204. The multiple digital signals outputted from the A/D conversion unit 203 are inputted to the MIMO equalization processing unit 204. The MIMO equalization processing unit 204 restores the multiple symbol sequences by space-time decoding the multiple inputted digital signals (step S204). The MIMO equalization processing unit 204 outputs each of the multiple restored symbol sequences to the demapping unit 205. The demapping unit 205 generates multiple binary signal sequences by demapping the multiple symbol sequences outputted from the MIMO equalization processing unit 204 (step S205). The demapping unit 205 outputs the multiple binary signal sequences.

Figure 4:
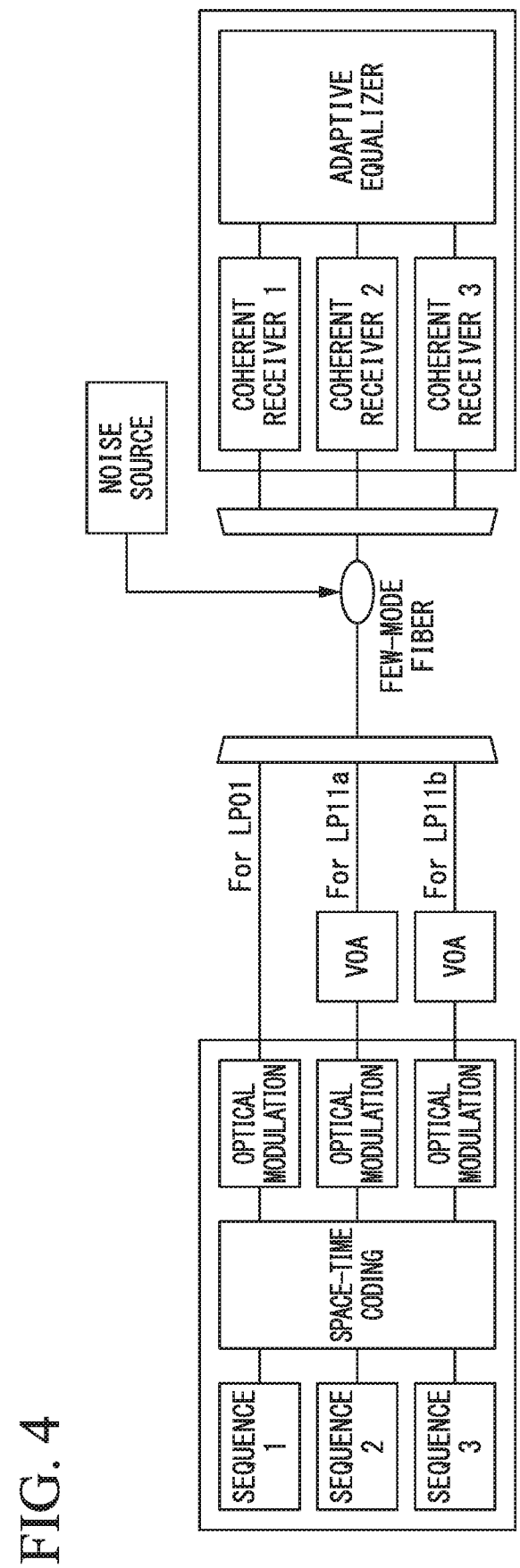
FIG. 4 is a diagram for explaining the effect of improving the robustness against mode-dependent loss in the first embodiment.

FIG. 4 is a diagram for explaining the effect of improving the robustness against mode-dependent loss in the first embodiment.

FIG. 4 shows an optical transmission evaluation system that was used to obtain optical transmission experimental data for the first embodiment. Here, dual-polarization 16 quadrature amplitude modulation (DP-16QAM) signals were used as the optical signals, a few-mode fiber was used as the transmission path, and mode-dependent loss was emulated by applying attenuation to the higher-order mode optical signals (LP11a, LP11b) using a variable optical attenuator (VOA). Coding was performed by using the Hadamard code described in the first embodiment as the space-time code, and mode separation and space-time decoding were performed by means of an adaptive equalizer in the optical reception apparatus 20. The measurement results are shown in FIG. 5.

Figure 5:
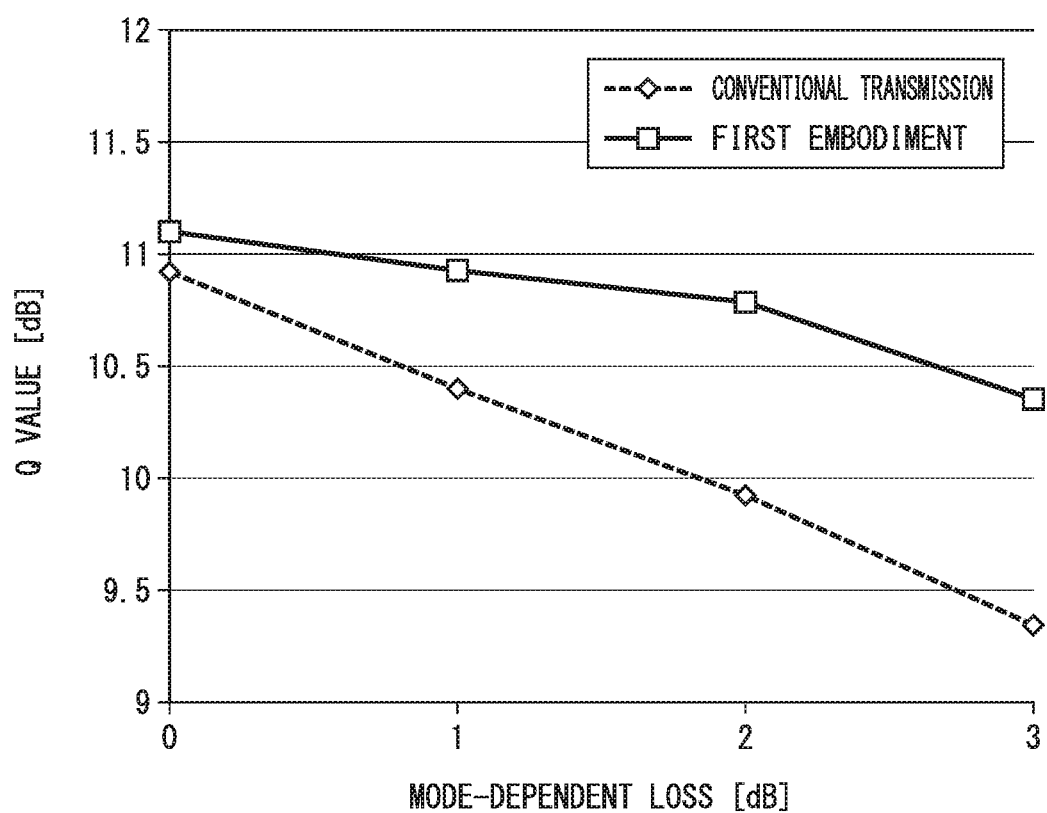
FIG. 5 is a diagram showing experiment results from FIG. 4.

The horizontal axis in FIG. 5 represents the attenuation applied by the VOA, i.e. the mode-dependent loss, and the vertical axis represents the Q value which indicates the optical signal quality, calculated from the error rate averaged over three modes. FIG. 5 shows that when the mode-dependent loss is 0 dB, the Q value for the first embodiment is roughly the same as that for conventional transmission, but as the mode-dependent loss becomes greater, the difference widens so that when the mode-dependent loss is 3 dB, a Q-value improvement of approximately 1 dB is obtained by the first embodiment. Thus, by implementing space-time coding, it is possible to transmit signals making use of diversity in time and space, as a result of which it is possible to raise the robustness against mode-dependent loss.

According to the optical transmission system 100 configured as described above, it is possible to improve the robustness of spatially multiplexed signals against mode-dependent loss in a spatial multiplexing transmission system using multi-mode fibers. Hereinbelow, this effect will be described in detail.

The optical transmission apparatus 10 performs space-time coding on multiple symbol sequences. Additionally, the optical transmission apparatus 10 transmits, to an optical reception apparatus 20, a mode-division multiplexed optical signal that is generated by converting the multiple space-time coded symbol sequences (coded symbol sequences) into different modes and mode-division multiplexing the signals. The optical reception apparatus 20 restores the multiple symbol sequences by space-time decoding the mode-division multiplexed optical signal transmitted from the optical transmission apparatus 10, converts the multiple restored symbol sequences into multiple binary signals, and outputs the multiple converted binary signals. Thus, it is possible to transmit signals making use of diversity in space and time by implementing space-time coding. For this reason, it becomes possible to improve the robustness of spatially multiplexed signals against mode-dependent loss in a spatial multiplexing transmission system using multi-mode fibers.

Modification Example

While an example wherein orthogonal transform was used for the space-time coding was described for the present embodiment, there is no need for such a limitation. For example, as other examples of space-time coding, the technologies described in the following Reference Document 1, Reference Document 2, and Reference Document 3 may be used. Reference Document 1 describes examples of space-time coding using space-time block codes and Alamouti's code. Additionally, Reference Document 2 describes an example of space-time coding using space-time trellis codes. Additionally, Reference Document 3 describes an example of space-time coding using the Golden code.

[Reference Document 1] Alamouti, Siavash M., "A simple transmit diversity technique for wireless communications", IEEE Journal on Selected Areas in Communications, Vol. 16, No. 8, 1998, pp. 1451-1458.

[Reference Document 2] Tarokh, Vahid, Nambi Seshadri, and A. Robert Calderbank, "Space-time codes for high data rate wireless communication: Performance criterion and code construction", IEEE Transactions on Information Theory, Vol. 44, No. 2, 1998, pp. 744-765.

[Reference Document 3] Belfiore, Jean-Claude, Ghaya Rekaya, and Emanuele Viterbo, "The Golden code: A 2×2 full-rate space-time code with nonvanishing determinants", IEEE Transactions on information theory, Vol. 51, No. 4, 2005, pp. 1432-1436.

Additionally, aside from space-time codes, the optical transmission apparatus 10 may use space-frequency codes.

The optical reception apparatus 20 may be configured so as not to perform demapping. When configured in this manner, the optical reception apparatus 20 does not include a demapping unit 205. The optical reception apparatus 20 outputs the multiple restored symbol sequences to another apparatus including a demapping unit 205. Furthermore, the other apparatus outputs multiple binary signal sequences that are generated by demapping the multiple symbol sequences.

Second Embodiment

Figure 6:
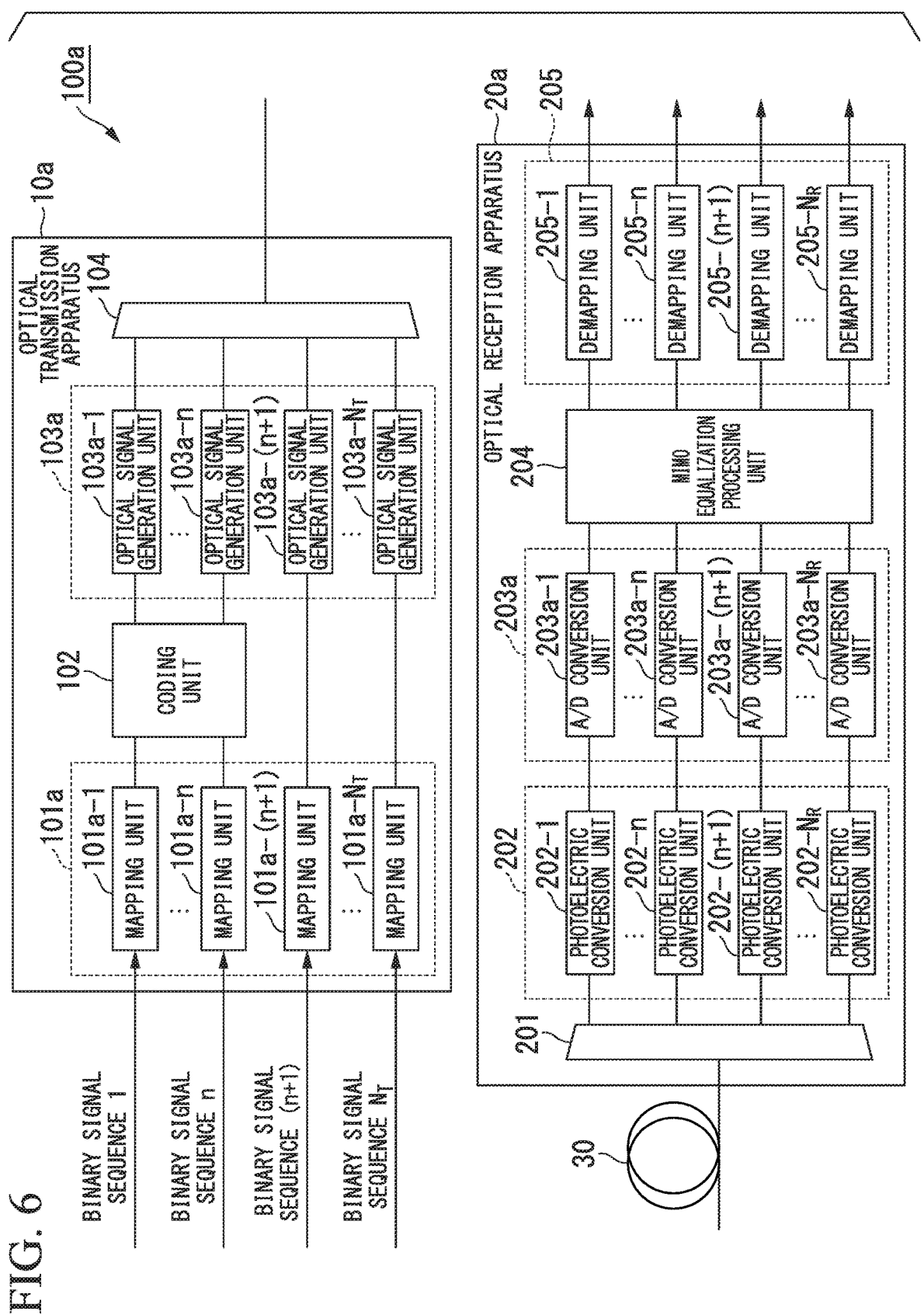
FIG. 6 is a diagram showing the system configuration of an optical transmission system 100a according to a second embodiment.

FIG. 6 is a diagram showing the system configuration of an optical transmission system 100a according to the second embodiment. The optical transmission system 100a includes an optical transmission apparatus 10a and an optical reception apparatus 20a. The optical transmission apparatus 10a and the optical reception apparatus 20a are connected so as to be capable of communicating via an optical transmission path 30.

In the optical transmission system 100a according to the second embodiment, the optical transmission apparatus 10a performs space-time coding on a portion of the symbol sequences (e.g., n symbol sequences) after mapping, but does not perform space-time coding on the other symbol sequences (e.g., $N_T-n$ symbol sequences). Additionally, the optical reception apparatus 20a performs space-time decoding on the portion of symbol sequences (e.g., n symbol sequences) that were space-time coded in the optical transmission apparatus 10a.

The second embodiment corresponds to an embodiment wherein space-time coding is performed in the multi-mode optical fiber between, for example, the six modes (LP01X, LP01Y, LP11aX, LP11aY, LP11bX, and LP11bY) that are degenerate to LP01 and LP11, but not between the six modes (LP21aX, LP21aY, LP21bX, LP21bY, LP02X, and LP02Y) that are degenerate to LP21 and LP02.

First, the optical transmission apparatus 10a will be described. The optical transmission apparatus 10a includes a mapping unit 101a, a coding unit 102, an optical signal generation unit 103a, and a mode multiplexer 104. The optical transmission apparatus 10a in the second embodiment differs from the optical transmission apparatus 10 in that it includes a mapping unit 101a and an optical signal generation unit 103a instead of a mapping unit 101 and an optical signal generation unit 103. The remaining structure of the optical transmission apparatus 10a is similar to that of the optical transmission apparatus 10. For this reason, a description of the entire optical transmission apparatus 10a will be omitted, and the mapping unit 101a and the optical signal generation unit 103a will be described.

The mapping unit 101a is formed from multiple mapping units 101a-1 to 101a-$N_T$. Multiple binary signal sequences 1 to $N_T$ are inputted to the mapping unit 101a. The mapping unit 101a generates multiple symbol sequences 1 to $N_T$ by converting the signal format of each of the inputted binary signal sequences 1 to $N_T$ into a desired signal format. Among the multiple symbol sequences 1 to $N_T$, the mapping unit 101a outputs the symbol sequences 1 to n (n<$N_T$) to the coding unit 102. Additionally, among the multiple symbol sequences 1 to $N_1$, the mapping unit 101a outputs the symbol sequence n+1 to $N_T$ (i.e., $N_T-n$ symbol sequences) to the optical signal generation unit 103a. As a result thereof, space-time coding is performed on some of the symbol sequences (e.g., symbol sequences 1 to n).

The optical signal generation unit 103a is formed from multiple optical signal generation units 103a-1 to 103a-$N_T$. The coded symbol sequences 1 to n outputted from the coding unit 102 and the symbol sequences n+1 to $N_T$ outputted from the mapping unit 101a are inputted to the optical signal generation unit 103a. The optical signal generation unit 103a converts the inputted coded symbol sequences 1 to n and symbol sequences n+1 to $N_T$ into optical signals. The optical signal generation unit 103a outputs multiple optical signals to the mode multiplexer 104.

Next, the optical reception apparatus 20a will be described. The optical reception apparatus 20a includes a mode demultiplexer 201, a photoelectric conversion unit 202, an A/D conversion unit 203a, an MIMO equalization processing unit 204, and a demapping unit 205. The optical reception apparatus 20a in the second embodiment differs in structure from the optical reception apparatus 20 in that it includes an A/D conversion unit 203a instead of the A/D conversion unit 203. The remaining structure of the optical reception apparatus 20a is similar to that of the optical reception apparatus 20. For this reason, a description of the entire optical transmission apparatus 20a will be omitted, and the description will focus on the A/D conversion unit 203a.

The A/D conversion unit 203a is formed from multiple A/D conversion units 203a-1 to 203a-$N_R$. The multiple electrical signals outputted from the photoelectric conversion unit 202 are inputted to the A/D conversion unit 203a. The A/D) conversion unit 203a converts the multiple inputted electrical signals, respectively, into digital signals. The A/D conversion unit 203a outputs the digital signals (n (where n<$N_R$) coded digital signals and $N_R-n$ uncoded digital signals) to the MIMO equalization processing unit 204.

The MIMO equalization processing unit 204 restores the $N_R$ symbol sequences by space-time decoding the $N_R$ digital signals outputted from the A/D conversion unit 203a. The MIMO equalization processing unit 204 outputs $N_R$ restored symbol sequences to the demapping unit 205.

Figure 7:
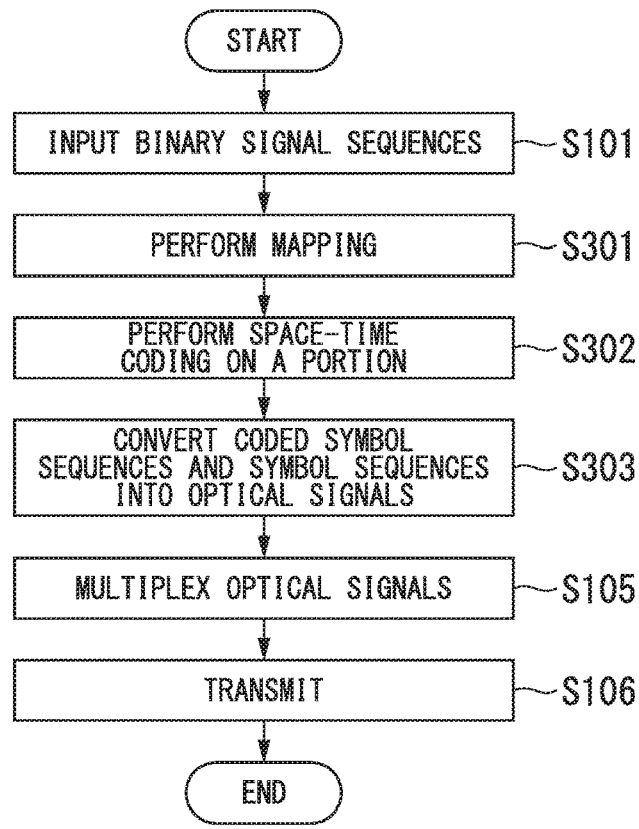
FIG. 7 is a flow chart showing the processing flow in an optical transmission apparatus 10a in the second embodiment.

FIG. 7 is a flow chart showing the processing flow in the optical transmission apparatus 10a in the second embodiment. The processes that are the same as those in FIG. 2 are denoted in FIG. 7 by the same reference signs as those used in FIG. 2, and the descriptions thereof will be omitted.

When multiple binary signal sequences are inputted to the mapping unit 101a by the processes in step S101, the mapping unit 101a generates multiple symbol sequences by converting the signal format of each of the multiple binary signal sequences into a desired signal format (step S301). Among the multiple symbol sequences, the mapping unit 101a outputs n symbol sequences to the coding unit 102. For example, each of the mapping units 101a-1 to 101a-n outputs a symbol sequence to the coding unit 102. Additionally, among the multiple symbol sequences, the mapping unit 101a outputs $N_T-n$ symbol sequences to the optical signal generation unit 103a. For example, the mapping units 101a-(n+1) to 101a-$N_T$ each output a symbol sequence to the optical signal generation unit 103a.

The n symbol sequences outputted from the mapping unit 101 are inputted to the coding unit 102, and n coded symbol sequences are generated by space-time coding the n inputted symbol sequences (step S302). The coding unit 102 outputs the n generated coded symbol sequences to the optical signal generation unit 103a. The optical signal generation unit 103a converts the n coded symbol sequences outputted from the coding unit 102 and the $N_T$-n symbol sequences outputted from the mapping unit 101a, respectively, into optical signals. The optical signal generation unit 103a outputs multiple ($N_T$) optical signals to the mode multiplexer 104 (step S303). Thereafter, the processes of step S105 and subsequent steps are performed.

Figure 8:
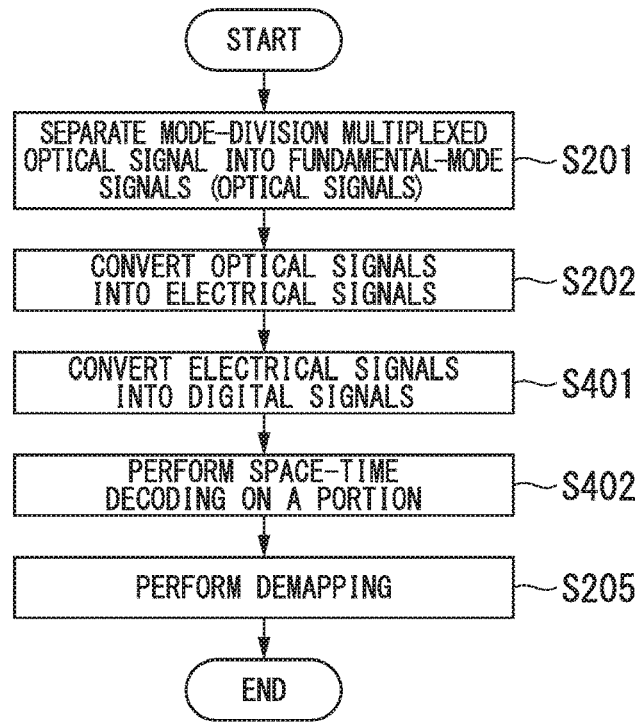
FIG. 8 is a flow chart showing the processing flow in an optical reception apparatus 20a in the second embodiment.

FIG. 8 is a flow chart showing the processing flow in the optical reception apparatus 20a in the second embodiment. The processes that are the same as those in FIG. 3 are denoted in FIG. 8 by the same reference signs as those used in FIG. 3, and the descriptions thereof will be omitted.

When step S202 is completed, the A/D conversion unit 203a converts the $N_R$ electrical signals outputted from the photoelectric conversion unit 202, respectively, into digital signals (step S401). The A/D conversion unit 203a outputs the n coded digital signals and the $N_R$-n uncoded digital signals, as $N_R$ digital signals, to the MIMO equalization processing unit 204. The MIMO equalization processing unit 204 restores the $N_R$ symbol sequences by space-time decoding the inputted $N_R$ digital signals (step S402). The MIMO equalization processing unit 204 outputs the $N_R$ restored symbol sequences to the demapping unit 205. Thereafter, the processes of step S205 are performed.

According to the optical transmission system 100a configured as described above, it is possible to obtain effects similar to those of the first embodiment.

Furthermore, with the optical transmission system 100a, space-time coding is performed on a portion of the information sequence. Since space-time coding is a process that spans across multiple sequences, a large amount of signal processing is generally involved. For that reason, by limiting the number of sequences that are subjected to the time-space coding process, effects such as the reduction of the desired LSI (Large Scale Integration) circuit size and the reduction of the power consumption can be expected.

Modification Example

The second embodiment may be modified in the same manner as the first embodiment.

The coding unit 102 may be configured so as to perform time-space coding independently between n information sequences and between ($N_T$-n) information sequences.

The optical reception apparatus 20a may be configured so as not to perform demapping. When configured in this manner, the optical reception apparatus 20a does not include a demapping unit 205. The optical reception apparatus 20a outputs the multiple restored symbol sequences to another apparatus including a demapping unit 205. Furthermore, the other apparatus outputs multiple binary signal sequences that are generated by demapping the multiple symbol sequences.

Third Embodiment

Figure 9:
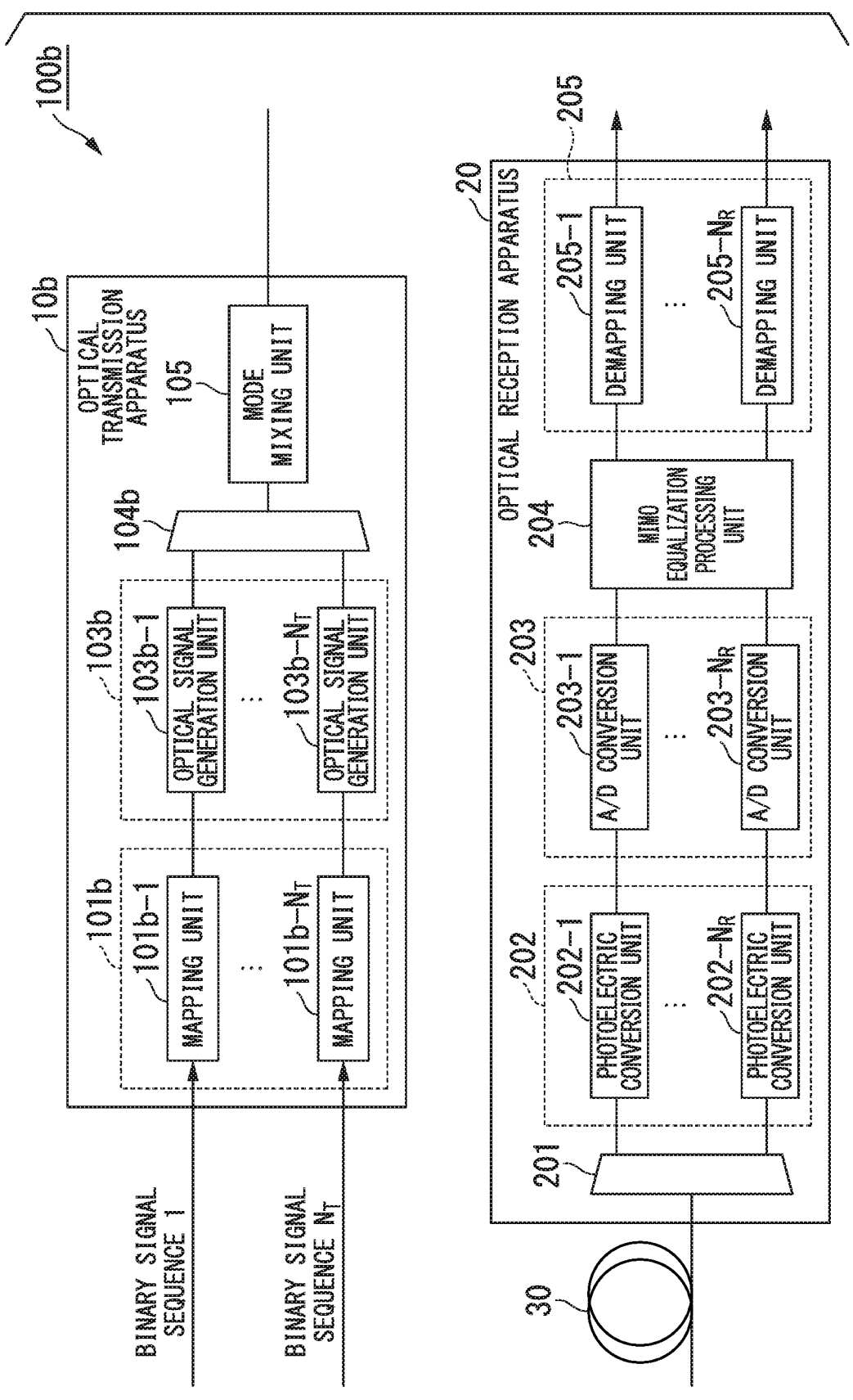
FIG. 9 is a diagram showing the system configuration of an optical transmission system 100b according to a third embodiment.

FIG. 9 is a diagram showing the system configuration of an optical transmission system 100b according to the third embodiment. The optical transmission system 100b includes an optical transmission apparatus 10b and an optical reception apparatus 20 that is the same as that in the first embodiment. The optical transmission apparatus 10b and the optical reception apparatus 20 are connected so as to be capable of communicating via an optical transmission path 30.

In the optical transmission system 100b according to the third embodiment, the optical transmission apparatus 10b does not perform space-time coding, and performs mode-mixing on the mode-division multiplexed optical signal.

The optical transmission apparatus 10b will be described. The optical transmission apparatus 10b includes a mapping unit 101b, an optical signal generation unit 103b, a mode multiplexer 104b, and a mode mixing unit 105. The optical transmission apparatus 10b in the third embodiment differs from the optical transmission apparatus 10 in that it includes a mapping unit 101b, an optical signal generation unit 103b, and a mode multiplexer 104b instead of a mapping unit 101, an optical signal generation unit 103, and a mode multiplexer 104, in that it does not include a coding unit 102, and in that it newly includes a mode mixing unit 105. The remaining structure of the optical transmission apparatus 10b is similar to that of the optical transmission apparatus 10. For this reason, a description of the entire optical transmission apparatus 10b will be omitted, and the mapping unit 101b, the optical signal generation unit 103b, the mode multiplexer 104b, and the mode mixing unit 105 will be described.

The mapping unit 101b is formed from multiple mapping units 101b-1 to 101b-$N_T$. Multiple binary signal sequences 1 to $N_T$ are inputted to the mapping unit 101b. The mapping unit 101b converts the signal format of each of the inputted binary signal sequences 1 to $N_T$ into a desired signal format. The mapping unit 101b outputs the multiple symbol sequences 1 to $N_T$ to the optical signal generation unit 103b.

The optical signal generation unit 103b is formed from multiple optical signal generation units 103b-1 to 103b-$N_T$. The symbol sequences 1 to $N_T$ outputted from the mapping unit 101b are inputted to the optical signal generation unit 103b. The optical signal generation unit 103b converts the inputted symbol sequences 1 to $N_T$ into optical signals. For example, a symbol sequence 1 is inputted to the optical signal generation unit 103b-1, and the inputted symbol sequence 1 is converted into an optical signal. Additionally, for example, a symbol sequence $N_T$ is inputted to the optical signal generation unit 103b-$N_T$, and the inputted symbol sequence $N_T$ is converted into an optical signal. The optical signal generation unit 103b outputs multiple optical signals to the mode multiplexer 104b.

The multiple optical signals outputted from the optical signal generation unit 103b are inputted to the mode multiplexer 104b. The mode multiplexer 104b generates a mode-division multiplexed optical signal by mode-division multiplexing the multiple inputted optical signals. The mode multiplexer 104b outputs the generated mode-division multiplexed optical signal to the mode mixing unit 105.

The mode-division multiplexed optical signal outputted from the mode multiplexer 104b is inputted to the mode mixing unit 105. The mode mixing unit 105 performs mode mixing on the inputted mode-division multiplexed optical signal. As the method of mode mixing, the technologies described in the following Reference Document 4 and Reference Document 5 may be applied. Reference Document 4 describes a configuration wherein mode mixing is performed by applying stress to a multi-mode fiber. Additionally, Reference Document 5 describes a configuration that uses a fiber grating.

[Reference Document 4] Li, An, et al., "Reception of mode and polarization multiplexed 107-Gb/s CO-OFDM signal over a two-mode fiber", National Fiber Optic Engineers Conference, Optical Society of America, 2011.

[Reference Document 5] Mori, Takayoshi, et al., "Equipartition multiplexing technique for equalizing channel dependent degradation in MDM transmission", Optical Fiber Communication Conference, Optical Society of America, 2015.

It is to be noted that the mode multiplexer 104b and the mode mixing unit 105 may be constituted by the same device. For example, specific examples using the same device include those using spatial optical systems, those using PLCs (Planar Lightwave Circuits) and those using photonic lanterns.

Figure 10:
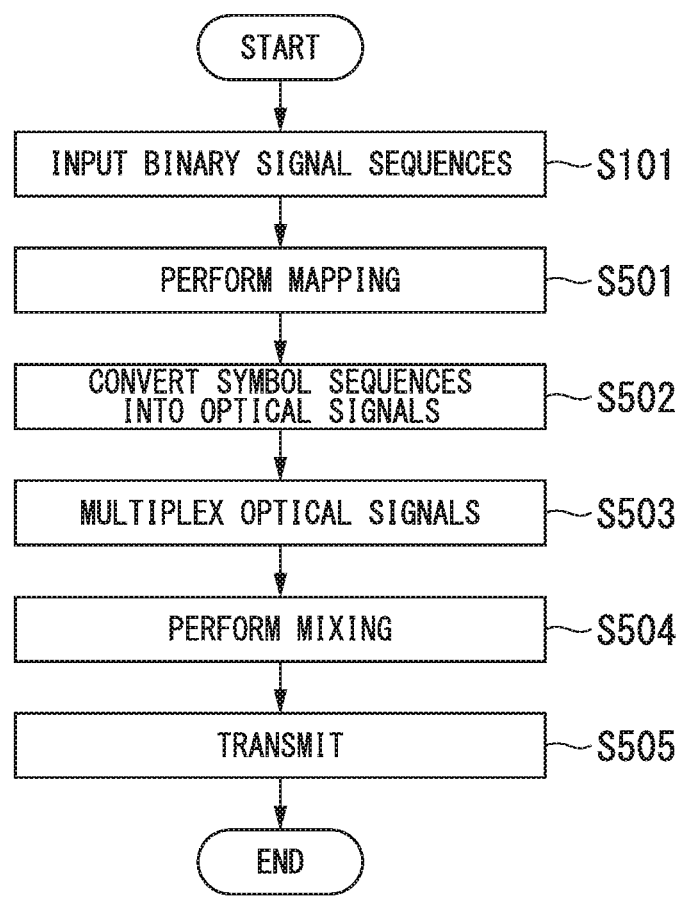
FIG. 10 is a flow chart showing the processing flow in an optical transmission apparatus 10b in the third embodiment.

FIG. 10 is a flow chart showing the processing flow in the optical transmission apparatus 10b in the third embodiment. The processes that are the same as those in FIG. 2 are denoted in FIG. 10 by the same reference signs as those used in FIG. 2, and the descriptions thereof will be omitted.

When the binary signal sequences are respectively inputted to the mapping units 101b to 101b-$N_T$ by the processes in step S101, the mapping unit 101b generates $N_T$ symbol sequences by converting the signal format of each of the $N_T$ binary signal sequences into a desired signal format (step S501). The mapping unit 101b outputs each of the $N_T$ symbol sequences to the optical signal generation unit 103b. The optical signal generation unit 103b converts the $N_T$ inputted symbol sequences, respectively, into optical signals (step S502). The optical signal generation unit 103b outputs the $N_T$ optical signals to the mode multiplexer 104b. The mode multiplexer 104b generates a mode-division multiplexed optical signal by mode-division multiplexing the $N_T$ optical signals outputted from the optical signal generation unit 103b (step S503). The mode multiplexer 104b outputs the mode-division multiplexed optical signal to the mode mixing unit 105. The mode mixing unit 105 performs mode mixing on the mode-division multiplexed optical signal (step S504). The mode mixing unit 105 transmits the mode-mixed mode-division multiplexed optical signal to the optical reception apparatus 20 via the optical transmission path 30 (step S505).

According to the optical transmission system 100b configured as described above, it is possible to improve the robustness of spatially multiplexed signals against mode-dependent loss in a spatial multiplexing transmission system using multi-mode fibers. Hereinbelow, this effect will be described in detail.

In the optical transmission system 100b, the effects of the above-indicated Equation 3 can be effectively applied to the mode-division multiplexed optical signal by mode mixing. For this reason, it becomes possible to improve the robustness of spatially multiplexed signals against mode-dependent loss in a spatial multiplexing transmission system using multi-mode fibers.

Modification Example

As with the first embodiment, the optical reception apparatus 20 may be configured so as not to perform demapping. When configured in this manner, the optical reception apparatus 20 does not include a demapping unit 205. The optical reception apparatus 20 outputs the multiple restored symbol sequences to another apparatus including a demapping unit 205. Furthermore, the other apparatus outputs multiple binary signal sequences that are generated by demapping the multiple symbol sequences.

Fourth Embodiment

Figure 11:
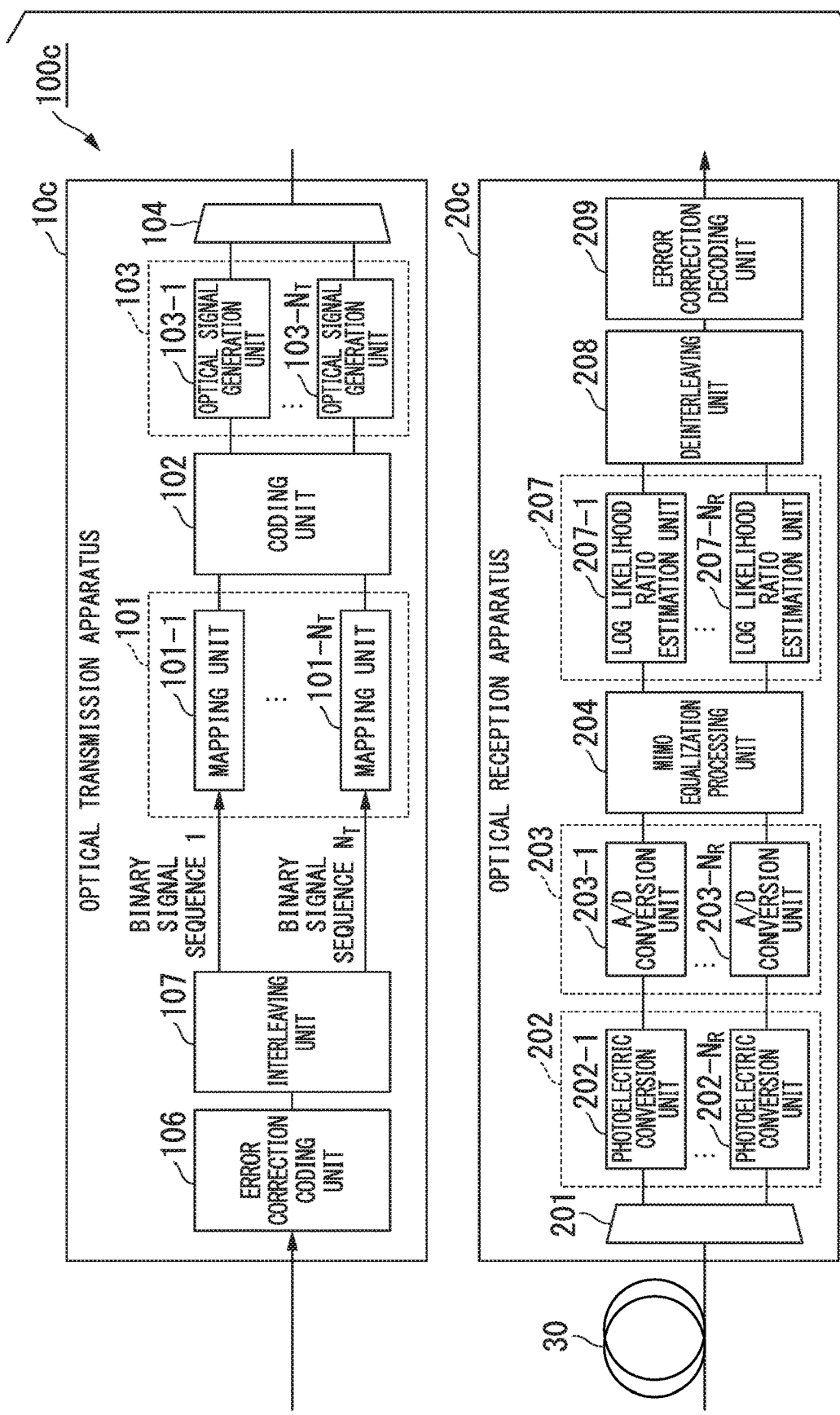
FIG. 11 is a diagram showing the system configuration of an optical transmission system 100c according to a fourth embodiment.

FIG. 11 is a diagram showing the system configuration of an optical transmission system 100c according to the fourth embodiment. The optical transmission system 100c includes an optical transmission apparatus 10c and an optical reception apparatus 20c. The optical transmission apparatus 10c and the optical reception apparatus 20c are connected so as to be capable of communicating via an optical transmission path 30.

Figure 12:
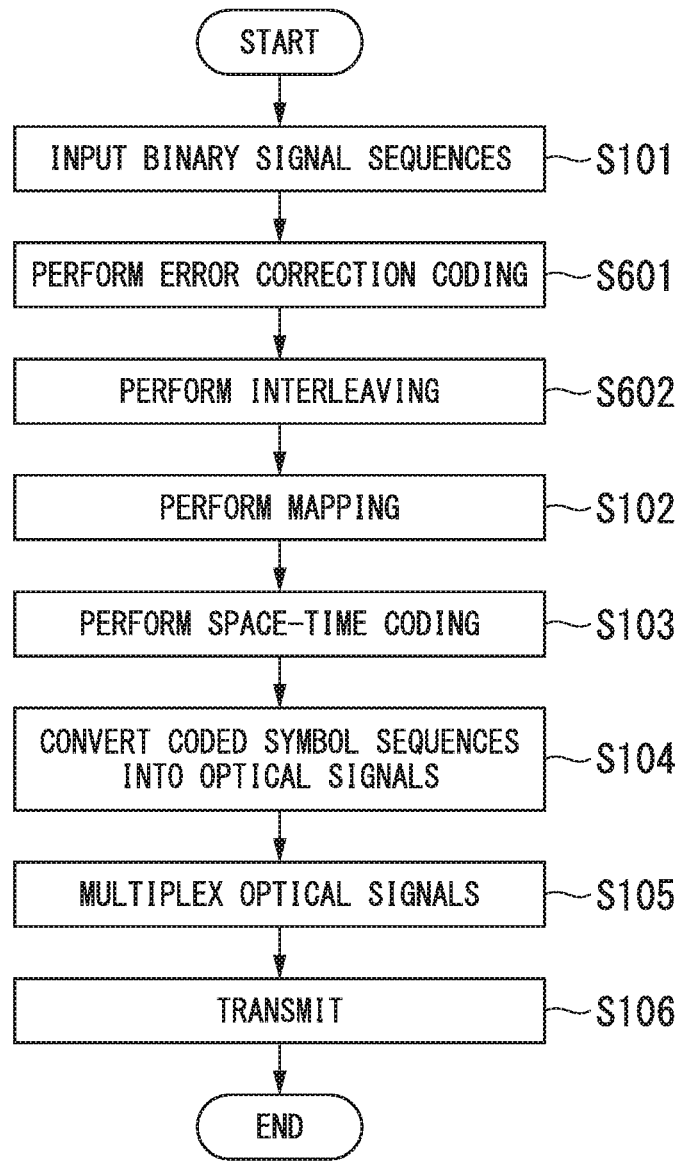
FIG. 12 is a flow chart showing the processing flow in an optical transmission apparatus 10c in the fourth embodiment.

First, the optical transmission apparatus 10c will be described. The basic structure of the optical transmission apparatus 10c is the same as that of the optical transmission apparatus 10. The optical transmission apparatus 10c differs from the optical transmission apparatus 10 in that it newly includes an error correction coding unit 106 and an interleaving unit 107 in front of the mapping unit 101. For this reason, a description of the entire optical transmission apparatus 10c will be omitted, and the error correction coding unit 106 and the interleaving unit 107 will be described. FIG. 12 is a flow chart showing the processing flow in the optical transmission apparatus 10c in the fourth embodiment. The processes that are the same as those in FIG. 2 are denoted in FIG. 12 by the same reference signs as those used in FIG. 2.

The error correction coding unit 106 performs error correction coding, using an error-correcting code, on the binary signal sequences that are inputted in step S101, so as to provide a certain level of redundancy between the bits in the binary signal sequences (step S601). As the error-correcting code, the application of an arbitrary block code or an arbitrary convolutional code could be contemplated. The error correction coding unit 106 outputs the error-correction coded binary signal sequences to the interleaving unit 107. The interleaving unit 107 interleaves the bits of the error-correction coded binary signal sequences in accordance with a fixed rule, and outputs the binary signal sequences 1 to $N_T$ obtained after interleaving to the mapping unit 101 (step S602). Thereafter, the processes of step S102 and subsequent steps are performed.

Figure 13:
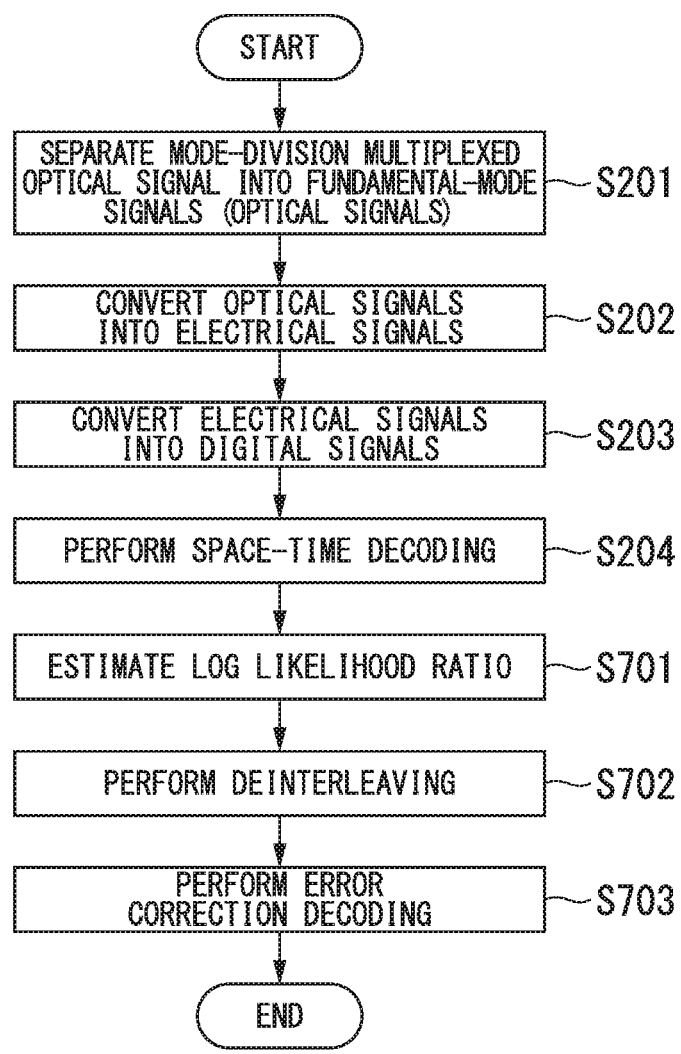
FIG. 13 is a flow chart showing the processing flow in an optical reception apparatus 20c in the fourth embodiment.

Next, the optical reception apparatus 20c will be described. The basic structure of the optical reception apparatus 20c is the same as that of the optical reception apparatus 20. The optical reception apparatus 20c differs from the optical reception apparatus 20 in that it includes, after the MIMO equalization processing unit 204, a log likelihood ratio estimation unit 207 instead of the demapping unit 205, and furthermore, newly includes a deinterleaving unit 208 and an error correction decoding unit 209. The log likelihood ratio estimation unit 207 is formed from multiple log likelihood ratio estimation units 207-1 to 207-$N_R$. For this reason, a description of the entire optical reception apparatus 20c will be omitted, and the log likelihood ratio estimation unit 207, the deinterleaving unit 208, and the error correction decoding unit 209 will be described. FIG. 13 is a flow chart showing the processing flow in the optical reception apparatus 20c in the fourth embodiment. The processes that are the same as those in FIG. 3 are denoted in FIG. 13 by the same reference signs as those used in FIG. 3.

After the processes in steps S201 to S204 are performed in the same manner as in the first embodiment, the log likelihood ratio estimation unit 207 estimates, for each bit constituting each of symbols in the symbol sequences obtained by the MIMO equalization process, the logarithm of the ratio between the probability that a 1 was sent and the probability that a 0 was sent (the so-called log likelihood ratio), under an assumption that these symbols are known (step S701). Additionally, the log likelihood ratio estimation unit 207 outputs multiple sequences of log likelihood ratios. The deinterleaving unit 208 deinterleaves the multiple sequences of log likelihood ratios inputted from the log likelihood ratio estimation unit 207 in accordance with a fixed rule, and outputs the log likelihood ratio sequences obtained by deinterleaving (step S702). The error correction decoding unit 209 performs error correction decoding of the log likelihood ratio sequences outputted from the deinterleaving unit 208 (step S703). In other words, the error correction decoding unit 209 makes hard decisions or soft decisions based on the inputted log likelihood ratio sequences, and outputs bit-error corrected binary signal sequences.

In the present embodiment, it is possible to combine space-time codes and error-correcting codes, whereby improvements in the space and time diversity effects can be expected.

Fifth Embodiment

Figure 14:
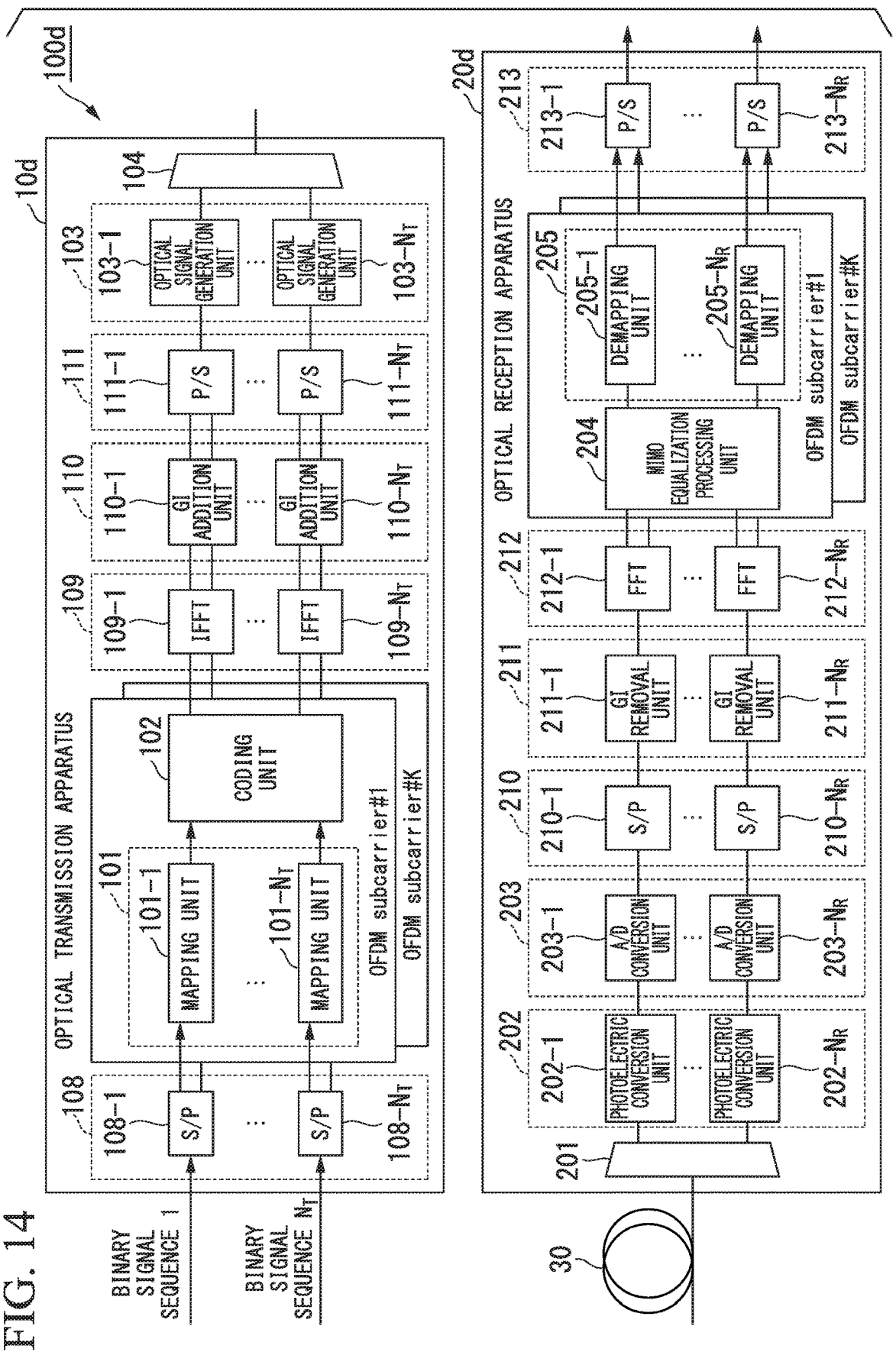
FIG. 14 is a diagram showing the system configuration of an optical transmission system 100d according to a fifth embodiment.

FIG. 14 is a diagram showing the system configuration of an optical transmission system 100d according to the fifth embodiment. The present embodiment uses multiple carriers instead of a single carrier as the optical carrier mode. Specifically, the present embodiment uses orthogonal frequency division multiplexing (OFDM). The optical transmission system 100d includes an optical transmission apparatus 10d and an optical reception apparatus 20d. The optical transmission apparatus 10d and the optical reception apparatus 20d are connected so as to be capable of communicating via an optical transmission path 30.

First, the optical transmission apparatus 10d will be described. The basic structure of the optical transmission apparatus 10d is the same as that of the optical transmission apparatus 10. The number of sub-carriers used in OFDM is denoted by K. The optical transmission apparatus 10d differs from the optical transmission apparatus 10 in that it newly includes a serial/parallel conversion unit 108, an inverse fast Fourier transform unit 109, a guard interval addition unit 110, and a parallel/serial conversion unit 111, and in that it includes K mapping units 101 and coding units 102. The serial/parallel conversion unit 108 is formed from multiple serial/parallel conversion units (indicated by S/P in FIG. 14) 108-1 to 108-$N_T$. The inverse fast Fourier transform unit 109 is formed from multiple inverse fast Fourier transform units (indicated by IFFT in FIG. 14) 109-1 to 109-$N_T$. The guard interval addition unit 110 is formed from multiple guard interval addition units (indicated as GI addition unit in FIG. 14) 110-1 to 110-$N_T$. The parallel/serial conversion unit 111 is formed from multiple parallel/serial conversion units (indicated by P/S in FIG. 14) 111-1 to 111-NT.

Figure 15:
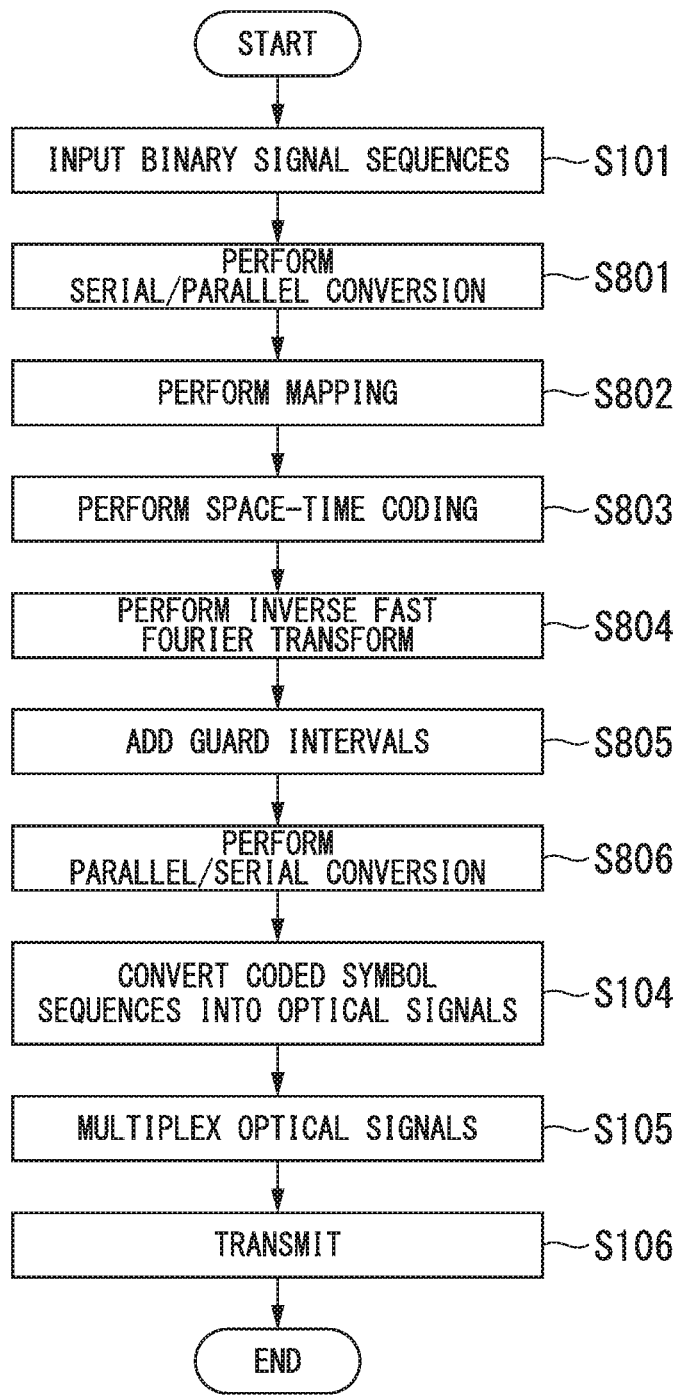
FIG. 15 is a flow chart showing the processing flow in an optical transmission apparatus 10d in the fifth embodiment.

FIG. 15 is a flow chart showing the processing flow in the optical transmission apparatus 10d according to the fifth embodiment. The processes that are the same as those in FIG. 2 are denoted in FIG. 15 by the same reference signs as those used in FIG. 2.

The binary signal sequences 1 to $N_T$ are inputted to the serial/parallel conversion unit 108 (step S101). The serial/parallel conversion unit 108 performs a serial/parallel conversion on each of the binary signal sequences 1 to $N_T$, and converts the binary signal sequences 1 to $N_T$, respectively, to K binary signal sequences (step S801). The serial/parallel conversion unit 108 outputs the converted binary signal sequences to the mapping unit 101. The mapping unit 101 converts the signal format of each of the $N_T$ binary signal sequences assigned to subcarrier number k (where 1≤k≤K) into a desired signal format, and outputs $N_T$ symbol sequences for each subcarrier (step S802). The coding unit 102 generates $N_T$ coded symbol sequences for each subcarrier by space-time coding the $N_T$ symbol sequences in each subcarrier (step S803). These actions are performed on all of the subcarriers, thereby resulting in a total of K·$N_T$ coded symbol sequences.

The K·$N_T$ coded symbol sequences outputted from the coding unit 102 are inputted to the inverse fast Fourier transform unit 109, separately for each of the K coded symbol sequences corresponding to all of the subcarriers in each mode. The inverse fast Fourier transform unit 109 applies an inverse fast Fourier transform to the inputted coded symbol sequences, thereby converting the inputted coded symbol sequences into coded symbol sequences in the time domain (step S804). In this case, the number of points used in the inverse fast Fourier transform is denoted as $N_{fft}$. Generally, $N_{fft}$ is a power of 2, and $N_{fft}$>K. Each of the K·$N_T$ coded symbol sequences is processed in blocks of $N_{fft}$ samples. Here, a block of $N_{fft}$ samples will be referred to as an OFDM symbol. The inverse fast Fourier transform unit 109 outputs the converted coded symbol sequences to the guard interval addition unit 110.

The guard interval addition unit 110 adds a guard interval of a predetermined length to the beginning of each of the OFDM symbols among the K·$N_T$ coded symbol sequences (step S805). The length $T_{GI}$ of the guard intervals is chosen so that $T_{GI}$>$T_{dis}$. Here, $T_{dis}$ is determined by dispersion phenomena that occur while an optical signal is being transmitted on the optical transmission path 30, for example, the magnitude of chromatic dispersion or mode dispersion.

The K·$N_T$ coded symbol sequences outputted from the guard interval addition unit 110 are inputted to the parallel/serial conversion unit 111 separately for each of the K coded symbol sequences corresponding to all of the subcarriers in each mode. The parallel/serial conversion unit 111 performs parallel/serial conversion of the inputted coded symbol sequences and outputs a total of $N_T$ serial sequences as the coded symbol sequences 1 to $N_T$ (step S806). Thereafter, the processes of step S104 and subsequent steps are performed.

Next, the optical reception apparatus 20d will be described. The basic structure of the optical reception apparatus 20d is the same as that of the optical reception apparatus 20. The optical reception apparatus 20d differs from the optical reception apparatus 20 in that it newly includes a serial/parallel conversion unit 210, a guard interval removal unit 211, a fast Fourier transform unit 212, and a parallel/serial conversion unit 213, and in that it includes K MIMO equalization processing units 204 and K demapping units 205.

The serial/parallel conversion unit 210 is formed from multiple serial/parallel conversion units (indicated by S/P in FIG. 14) 210-1 to 210-$N_R$. The guard interval removal unit 211 is formed from multiple guard interval removal units (indicated by GI removal unit in FIG. 14) 211-1 to 211-$N_R$. The fast Fourier transform unit 212 is formed from multiple fast Fourier transform units (indicated by FFT in FIG. 14) 212-1 to 212-$N_R$. The parallel/serial conversion unit 213 is formed from multiple parallel/serial conversion units (indicated by P/S in FIG. 14) 213-1 to 213-$N_R$.

Figure 16:
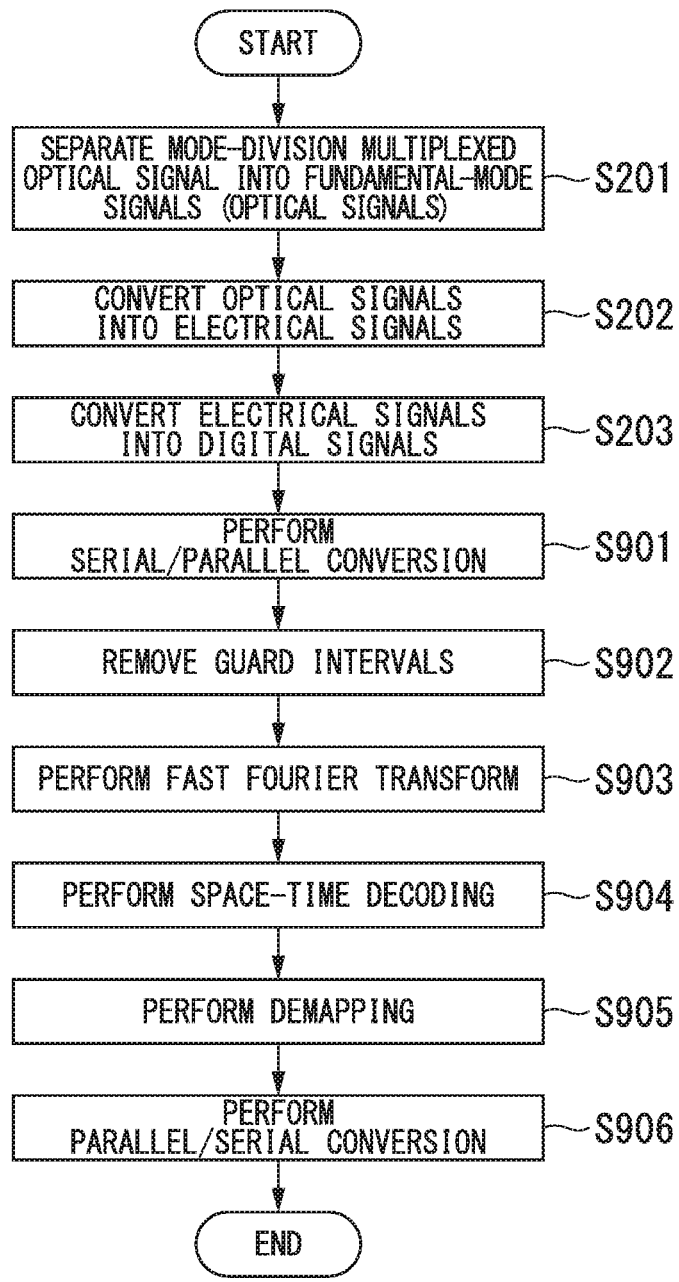
FIG. 16 is a flow chart showing the processing flow in an optical reception apparatus 20d in the fifth embodiment.

FIG. 16 is a flow chart showing the processing flow in the optical reception apparatus 20d in the fifth embodiment. The processes that are the same as those in FIG. 3 are denoted in FIG. 16 by the same reference signs as those used in FIG. 3. After the processes in steps S201 to S203 are performed in the same manner as in the first embodiment, the A/D conversion unit 203 outputs the multiple digital signals to the serial/parallel conversion unit 210. The serial/parallel conversion unit 210 performs serial/parallel conversion of the multiple inputted digital signals and outputs the resulting multiple digital signals to the guard interval removal unit 211 (step S901). The guard interval removal unit 211 removes the guard interval from the beginning of each OFDM symbol in the multiple inputted digital signals, and outputs OFDM symbols from which the guard intervals have been removed (step S902).

The fast Fourier conversion unit 212 performs a fast Fourier transform on the OFDM symbols inputted from the guard interval removal unit 211, and outputs the multiple resulting digital signals (step S903). The number of points used in the fast Fourier transform generally matches the number of points $N_{ff t}$ used in the inverse fast Fourier transform unit 109. The multiple digital signals outputted from the fast Fourier transform unit 212 are inputted to the MIMO equalization processing unit 204 separately for each of $N_R$ symbol sequences in each subcarrier.

The MIMO equalization processing unit 204 performs processes corresponding to equalization and space-time decoding on the multiple inputted digital signals (step S904). The MIMO equalization processing unit 204 restores a total of $K \cdot N_R$ symbol sequences by decoding the multiple digital signals. The MIMO equalization processing unit 204 outputs the restored $K \cdot N_R$ symbol sequences to the demapping unit 205. The demapping unit 205 performs demapping on the $K \cdot N_R$ symbol sequences outputted from the MIMO equalization processing unit 204, and inputs the multiple resulting binary signal sequences to the parallel/serial conversion unit 213 (step S905). The parallel/serial conversion unit 213 performs parallel/serial conversion on the multiple binary signal sequences inputted from the demapping unit 205, and outputs NR serial sequences (step S906).

Modification Example

While an example in which error correction coding is not applied was described for the present embodiment, there is no need for such a limitation. For example, it is possible to apply an error-correcting code to the present embodiment by adding an error correction coding unit 106 and an interleaving unit 107 to the input portion of the optical transmission apparatus 10d, and adding a deinterleaving unit 208 and an error correction decoding unit 209 to the output portion of the optical reception apparatus 20d. As a result thereof, it is possible to combine space-time codes and error-correcting codes, whereby improvements in the space and time diversity effects can be expected.

While embodiments of the present invention have been described in detail with reference to the drawings above, the specific structure is not limited to these embodiments, and designs or the like that lie within a range not departing from the gist of the present invention are included.

For example, the above-described optical transmission apparatuses and optical reception apparatuses may be implemented by using a computer. In that case, a program for implementing the functions of the apparatuses may be recorded onto a computer-readable recording medium, and the program recorded on the recording medium may be read into and executed by a computer system so as to obtain the optical transmission apparatuses and the optical reception apparatuses. It is to be noted that a computer system, as indicated here, includes an OS (Operating System) and hardware such as peripheral devices. Additionally, a computer-readable recording medium refers to portable media such as flexible disks, magneto-optic disks, ROMs (Read-Only Memory) and CD (Compact Disc)-ROMs, or memory apparatus such as hard disks that are internal to the computer system. Furthermore, the computer-readable recording medium also includes media that only hold the program dynamically, for a short period of time, such as communication cables when the program is transmitted over a network such as the internet or over communication lines such as telephone lines, and media that hold the program for a certain period of time, such as volatile memories inside computer systems such as servers or clients in the above-mentioned cases. Additionally, the above-mentioned program may be for implementing just some of the aforementioned functions. Furthermore, the above-mentioned program may be implemented by combining the aforementioned functions with a program that is already recorded in the computer system. Alternatively, the optical transmission apparatuses and optical reception apparatuses may be implemented by using hardware such as a PLD (Programmable Logic Device), an FPGA (Field Programmable Gate Array), or a DSP (Digital Signal Processor).

INDUSTRIAL APPLICABILITY

The present invention can be applied to optical transmission such as spatially multiplexed transmission. According to the present invention, it is possible to improve the robustness of spatially multiplexed signals against mode-dependent loss in a spatial multiplexing transmission system.

DESCRIPTION OF REFERENCE SIGNS 10, 10a, 10b, 10c, 10d Optical transmission apparatus
20, 20a, 20c, 20d Optical reception apparatus Optical transmission path
101, 101a, 101b (101-1 to 101-$N_T$, 101a-1 to 101a-$N_T$, 101b-1 to 101b-$N_T$) Mapping unit (conversion unit)
102 Coding unit
103, 103a, 103b (103-1 to 103-$N_T$, 103a-1 to 103a-$N_T$, 103b-1 to 103b-$N_T$) Optical signal generation unit
104, 104b Mode multiplexer
105 Mode mixing unit
106 Error correction coding unit
107 Interleaving unit
108 (108-1 to 108-$N_T$) Serial/parallel conversion unit
109 (109-1 to 109-$N_T$) Inverse fast Fourier transform unit
110 (110-1 to 110-$N_T$) Guard interval addition unit
111 (111-1 to 111-$N_T$) Parallel/serial conversion unit
201 Mode demultiplexer
202 (202-1 to 202-$N_R$) Photoelectric conversion unit
203, 203a (203-1 to 203-$N_R$, 203a-1 to 203a-$N_R$) A/D conversion unit
204 MIMO equalization processing unit
205 (205-1 to 205-$N_R$) Demapping unit
207 (207-1 to 207-$N_R$) Log likelihood ratio estimation unit
208 Deinterleaving unit
209 Error correction decoding unit
210 (210-1 to 210-$N_R$) Serial/parallel conversion unit
211 (211-1 to 211-$N_R$) Guard interval removal unit
212 (212-1 to 212-$N_R$) Fast Fourier transform unit
213 (213-1 to 213-$N_R$) Parallel/serial conversion unit

The invention claimed is:

1. An optical transmission system comprising an optical transmission apparatus and an optical reception apparatus, wherein the optical transmission apparatus comprises:
a conversion unit that converts multiple binary data sequences into data in a predetermined signal format;
a coding unit that generates multiple pieces of coded data by performing predetermined coding on each of the multiple pieces of converted data;
an optical signal generation unit that generates multiple optical signals by converting the multiple pieces of coded data to optical signals; and
a mode multiplexer that converts the multiple optical signals to different modes, generates a mode-division multiplexed optical signal by mode-division multiplexing the optical signals, and transmits the generated mode-division multiplexed optical signal to the optical reception apparatus,
the optical reception apparatus comprises:
a mode demultiplexer that demultiplexes the mode-division multiplexed optical signal transmitted from the optical transmission apparatus into light in different modes;
a photoelectric conversion unit that converts the light in the multiple different modes into electrical signals;
an analog/digital conversion unit that converts the multiple electrical signals into coded data; and
an MIMO equalization processing unit that performs MIMO equalization processing on the converted coded data, and
the predetermined coding is space-time coding or space-frequency coding.

2. An optical transmission system comprising an optical transmission apparatus and an optical reception apparatus, wherein the optical transmission apparatus comprises:
a conversion unit that converts multiple binary data sequences to data in a predetermined signal format;
a coding unit that generates coded data by performing predetermined coding on a portion of the data among the multiple pieces of converted data;
an optical signal generation unit that generates multiple optical signals by converting the coded data and uncoded data into optical signals; and
a mode multiplexer that converts the multiple optical signals into different modes, generates a mode-division multiplexed optical signal by mode-division multiplexing the optical signals, and transmits the generated mode-division multiplexed optical signal to the optical reception apparatus,
the optical reception apparatus comprises:
a mode demultiplexer that demultiplexes the mode-division multiplexed optical signal transmitted from the optical transmission apparatus into light in different modes;
a photoelectric conversion unit that converts the light in the multiple different modes into electrical signals;
an analog/digital conversion unit that converts the multiple electrical signals into one of the coded data and the uncoded data; and
an MIMO equalization processing unit that performs MIMO equalization processing on the converted coded data and the converted uncoded data, and
the predetermined coding is space-time coding or space-frequency coding.

3. The optical transmission system according to claim 1, wherein the coding unit performs the predetermined coding by orthogonal transform.

4. An optical transmission system comprising an optical transmission apparatus and an optical reception apparatus, wherein the optical transmission apparatus comprises:
a conversion unit that converts multiple binary data sequences into data in a predetermined signal format;
an optical signal generation unit that generates multiple optical signals by converting the multiple pieces of data into optical signals;
a mode multiplexer that converts the multiple generated optical signals into different modes and generates a mode-division multiplexed optical signal by mode-division multiplexing the optical signals; and
a mode mixing unit that performs mode mixing on the generated mode-division multiplexed optical signal, effectively applies a predetermined coding effect to the mode-division multiplexed optical signal, and transmits the mode-mixed mode-division multiplexed optical signal to the optical reception apparatus,
the optical reception apparatus comprises:
a mode demultiplexer that demultiplexes the mode-mixed mode-division multiplexed optical signal transmitted from the optical transmission apparatus into light in different modes;
a photoelectric conversion unit that converts the light in the multiple different modes into electrical signals;
an analog/digital conversion unit that converts the multiple electrical signals into the data; and
an MIMO equalization processing unit that performs MIMO equalization processing on the converted, and
the predetermined coding effect is an effect by space-time coding or space-frequency coding.

5. The optical transmission system according to claim 4, wherein the mode mixing unit effectively applies the predetermined coding effect to the mode-division multiplexed optical signal by orthogonal transform.

6. An optical transmission apparatus in an optical transmission system comprising the optical transmission apparatus and an optical reception apparatus, the optical transmission apparatus comprising:
a conversion unit that converts multiple binary data sequences into data in a predetermined signal format;
a coding unit that generates multiple pieces of coded data by performing predetermined coding on each of the multiple pieces of converted data;
an optical signal generation unit that generates multiple optical signals by converting the multiple pieces of coded data into optical signals; and
a mode multiplexer that converts the multiple optical signals into different modes, generates a mode-division multiplexed optical signal by mode-division multiplexing the optical signals, and transmits the generated mode-division multiplexed optical signal to the optical reception apparatus,
wherein the predetermined coding is space-time coding or space-frequency coding.

7. An optical transmission apparatus in an optical transmission system comprising the optical transmission apparatus and an optical reception apparatus, the optical transmission apparatus comprising:
a conversion unit that converts multiple binary data sequences into data in a predetermined signal format;
a coding unit that generates coded data by performing predetermined coding on a portion of the data among the multiple pieces of converted data;
an optical signal generation unit that generates multiple optical signals by converting the coded data and uncoded data into optical signals; and a mode multiplexer that converts the multiple optical signals into different modes, generates a mode-division multiplexed optical signal by mode-division multiplexing the optical signals, and transmits the generated mode-division multiplexed optical signal to the optical reception apparatus wherein the predetermined coding is space-time coding or space-frequency coding.

8. An optical transmission apparatus in an optical transmission system comprising the optical transmission apparatus and an optical reception apparatus, the optical transmission apparatus comprising:

a conversion unit that converts multiple binary data sequences into data in a predetermined signal format;

an optical signal generation unit that generates multiple optical signals by converting the multiple pieces of data into optical signals;

a mode multiplexer that converts the multiple generated optical signals into different modes and generates a mode-division multiplexed optical signal by mode-division multiplexing the optical signals; and a mode mixing unit that performs mode mixing on the generated mode-division multiplexed optical signal, effectively applies a predetermined coding effect to the mode-division multiplexed optical signal, and transmits the mode-mixed mode-division multiplexed optical signal to the optical reception apparatus wherein the predetermined coding effect is an effect by space-time coding or space-frequency coding.

9. The optical transmission system according to claim 2, wherein the coding unit performs the predetermined coding by orthogonal transform.

* * * * *